US012798774B2

(12) United States Patent
Setele et al.

(10) Patent No.: US 12,798,774 B2
(45) Date of Patent: Nov. 17, 2026

(54) SYSTEMS FOR SUPPLYING ELECTRICITY AT A TRAY ASSEMBLY FOR A PASSENGER SEAT OF A TRANSPORTATION VEHICLE

(71) Applicant: Panasonic Avionics Corporation, Irvine, CA (US)

(72) Inventors: Mark Setele, Ladera Ranch, CA (US); Gus Celaya, Mission Viejo, CA (US); Thong Pham, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 153 days.

(21) Appl. No.: 18/771,034

(22) Filed: Jul. 12, 2024

(65) Prior Publication Data

US 2026/0015085 A1 Jan. 15, 2026

(51) Int. Cl.
*B64D 11/06* (2006.01)

(52) U.S. Cl.
CPC ...... *B64D 11/0624* (2014.12); *B64D 11/0638* (2014.12)

(58) Field of Classification Search
CPC ...... A47C 7/70; B60N 3/004; B64D 11/0624; B64D 11/0638; B60R 2011/0015; A47B 31/06; A47B 83/02
USPC .......................................................... 297/163
See application file for complete search history.

(56) References Cited

U.S. PATENT DOCUMENTS 10,301,028 B2 * 5/2019 Stephens .......... B64D 11/00152
10,556,684 B2 * 2/2020 Margis ...................... G06F 1/18
11,383,843 B2 * 7/2022 Wanner .............. B64D 11/0638
11,979,048 B2 * 5/2024 Huffman .................. B60N 2/90
12,304,374 B2 * 5/2025 Mansouri ............... B60N 3/004
2006/0175882 A1 * 8/2006 Schweizer ......... B64D 11/0627 297/146
2009/0249408 A1 * 10/2009 Smallhorn ......... B64D 11/0624 725/75
2013/0093220 A1 * 4/2013 Pajic ....................... H02J 50/10 297/163
2013/0327255 A1 * 12/2013 Pajic ...................... B64D 11/06 108/25
2014/0167457 A1 * 6/2014 Schultheis ......... B64D 11/0627 297/162
2015/0244127 A1 * 8/2015 Kim ........................ B60R 11/02 439/34
2016/0039525 A1 * 2/2016 Pajic .................. B64D 11/0638 108/44
2016/0249073 A1 * 8/2016 Margis ............... B64D 11/0638
(Continued)

*Primary Examiner* — William L Miller
(74) *Attorney, Agent, or Firm* — LOZA & LOZA, LLP

(57) ABSTRACT

Systems are provided for supplying electricity at a tray assembly for a passenger seat of a transportation vehicle. In some aspects, the tray assembly includes a center bar including an electrical outlet and a tray table pivotably coupled to a first support arm at a first corner and to a second support arm at a second corner, the tray table being pivotably coupled to the first support arm and the second support arm to move between a stow position and an open position where the tray table is substantially parallel to a floor and released from a seatback. The center bar is pivotably coupled to the tray table to be movable to a first position where the electrical outlet faces substantially upward during the open position, and to be movable to a second position where the electrical outlet face substantially downward during the stow position.

18 Claims, 24 Drawing Sheets

(56) References Cited

U.S. PATENT DOCUMENTS

| | | | | |
|---|---|---|---|---|
| 2016/0250362 | A1* | 9/2016 | Mackin | B64D 11/06 244/118.5 |
| 2016/0280375 | A1* | 9/2016 | Heredia | G06F 3/04886 |
| 2017/0166141 | A1* | 6/2017 | Pajic | B60R 11/0252 |
| 2017/0283067 | A1* | 10/2017 | Darbyshire | B64D 11/0638 |
| 2018/0281967 | A1* | 10/2018 | Stephens | B64D 11/0636 |
| 2020/0290523 | A1* | 9/2020 | Pajic | B60N 3/004 |
| 2022/0234739 | A1* | 7/2022 | Morales Morales | B60R 11/0241 |
| 2023/0159169 | A1* | 5/2023 | Kodati | B64D 11/06 108/134 |
| 2025/0062641 | A1* | 2/2025 | Stanton | B64D 11/0638 |

* cited by examiner

SYSTEMS FOR SUPPLYING ELECTRICITY AT A TRAY ASSEMBLY FOR A PASSENGER SEAT OF A TRANSPORTATION VEHICLE

TECHNICAL FIELD

The present disclosure relates to a tray assembly for a passenger seat of a transportation vehicle, and more particularly, to supplying electricity for user devices at a tray assembly for a passenger seat of a transportation vehicle such as an aircraft.

BACKGROUND

Passenger seats of transportation vehicles such as aircrafts often have tray tables installed on the back sides of the passenger seats. For example, a tray table can be stowed close to a back side of a passenger seat at a stow position when the tray table is not being used. To use this tray table, the tray table can be moved from the stow position to an open position that is generally horizontal to a floor of the transportation vehicle, such that a passenger may place items or food on the tray table.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices are powered by batteries that can be recharged.

Some passenger seats are implemented with a power outlet at bottom portions of the passenger seats so that the personal electronic devices may be plugged in for electricity. Continuous efforts are being made to develop various approaches to provide electricity to personal electronic devices around passenger seats of transportation vehicles. However, approaches to provide electricity at or around a tray assembly of a passenger seat have not been extensively studied or implemented.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, innovative features are disclosed for supplying electricity at a tray assembly for a passenger seat of a transportation vehicle. Each passenger of a transportation vehicle such as an aircraft often uses a tray table for a passenger seat and generally carries one or more electronic devices. Hence, providing a way for a passenger to plug in an electronic device near a tray assembly including the tray table is desired. By implementing one or more power outlets and/or at least one wireless charging module with the tray assembly, a passenger may conveniently power an electronic device while sitting on a passenger seat.

Figure 1A:
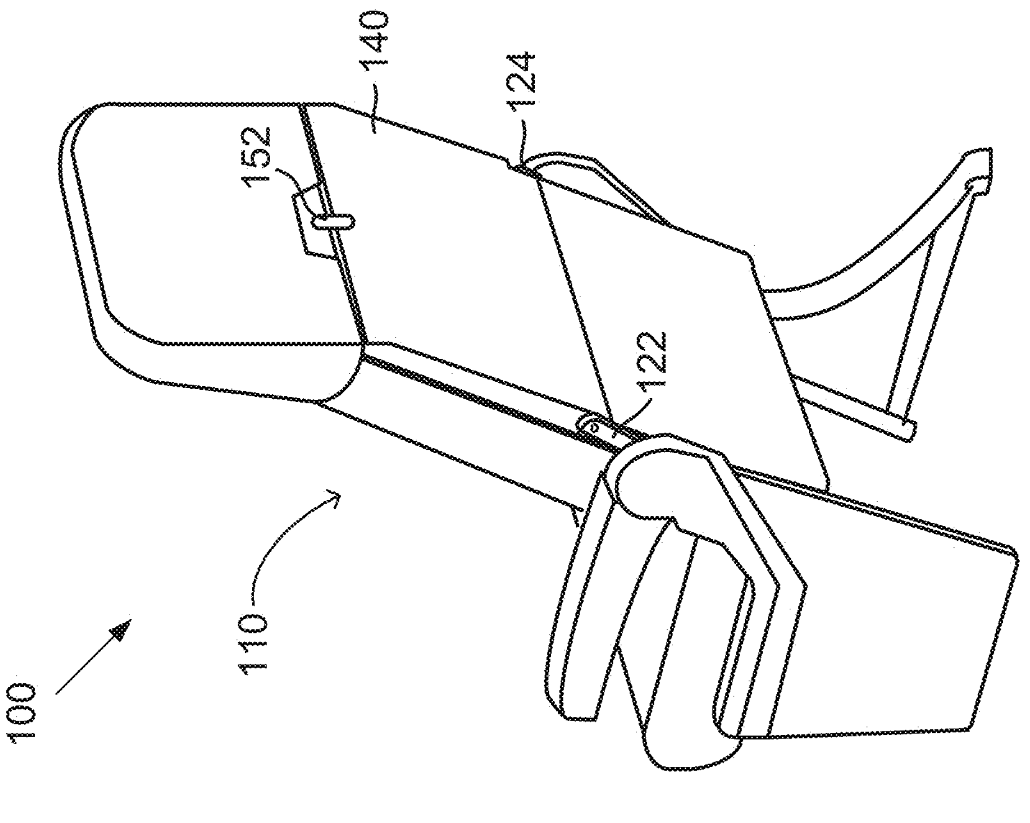
FIG. 1A shows an example diagram of a passenger seat with a tray table in a stow position.

FIG. 1A shows an example diagram 100 of a passenger seat 110 with a tray table 140 in a stow position. The passenger seat 110 is implemented in a transportation vehicle such as an aircraft. As shown in FIG. 1A, on a back side of the passenger seat 110, the tray table 140 may be installed. In the stow position, a locking mechanism 152 may be implemented to maintain the tray table 140 in the stow position, where the tray table is substantially parallel and anchored to a seatback of the passenger seat 110 by the locking mechanism 152. A first support arm 122 is coupled to a left side of the passenger seat 110 and the second support arm 124 is coupled to a right side of the passenger seat 110. The tray table 140 is pivotably coupled to the first support arm 122 at a left corner of the tray table 140 and is pivotably coupled to the second support arm 124 at a right corner of the tray table 140. Hence, when the locking mechanism 152 releases the tray table 140, the tray table 140 may be moved to an open position with the first support arm 122 and the second support arm 124 being pivotably coupled to the tray table 140.

Figure 1B:
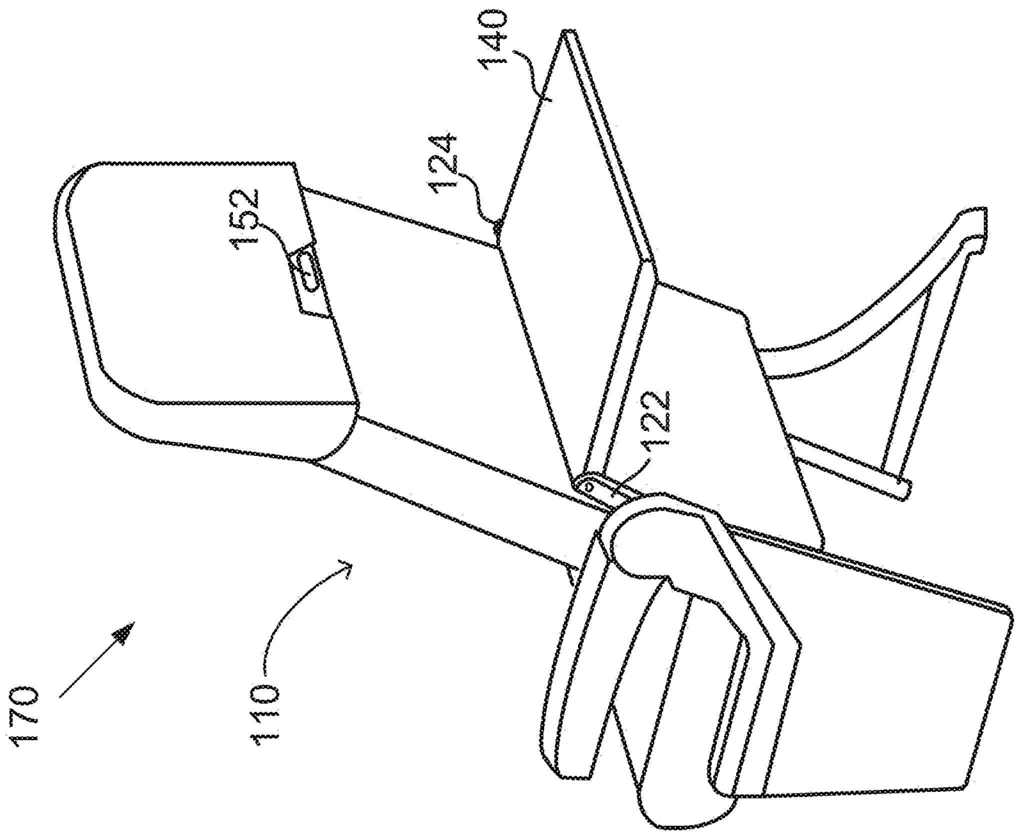
FIG. 1B shows an example diagram of the passenger seat of FIG. 1A with the tray table in an open position.

FIG. 1B shows an example diagram 170 of the passenger seat 110 with the tray table 140 in an open position. With the locking mechanism 152 releasing the tray table 140, the tray table 140 is moved to an open position away from the seatback, where the tray table 140 is substantially parallel to a floor of the transportation vehicle. When the tray table 140 is in the open position, a passenger sitting behind the passenger seat 110 may place items or food on the tray table 140.

More and more personal electronic devices are carried by passengers of a transportation vehicle. For example, almost every passenger carries a mobile device such as a mobile phone when boarding an aircraft. Therefore, there is a need to provide electrical supply for personal electronic devices, such that passengers can use their personal electronic devices without worrying about a battery life. In some cases, power outlets are provided at a bottom side of a passenger seat and/or at a seatback of a passenger seat. When a passenger seat is equipped with a tray table as shown in FIGS. 1A and 1B, a passenger generally uses the tray table for a significant amount of time. However, a tray assembly that includes a tray table and other components connected to the tray table is generally not used to provide electrical power. Therefore, a passenger may experience inconvenience when the passenger tries to find a power source for a personal electronic device, especially when the passenger is using the tray table.

According to some aspects of the disclosure, a tray assembly for a passenger seat of a transportation vehicle includes a feature to supply electricity to a personal electronic device. In particular, the tray assembly includes a tray table pivotably coupled to a first support arm at a first corner of the tray table and pivotably coupled to a second support arm at a second corner of the tray table, where the first support arm and the second support arm are coupled to the passenger seat. Here, the tray table being pivotably coupled to the first support arm and the second arm to pivotably move between a stow position where the tray table is substantially parallel and anchored to a seatback of the passenger seat and an open position where the tray table is substantially parallel to a floor of the transportation vehicle and released away from the seatback.

According to one aspect of the disclosure, the tray assembly includes the tray table and a center bar that includes at least one electrical outlet, where the center bar is pivotably coupled to the tray table. In some aspects, the center bar is pivotably coupled to the tray table to be movable to a first position where the at least one electrical outlet faces substantially upward with respect to the floor, when the tray table is in the open position, and to be movable to a second position where the at least one electrical outlet face substantially downward with respect to the floor, when the tray table is in the stow position. According to another aspect of the disclosure, the tray assembly includes the tray table, where the tray table includes at least one wireless charging module embedded within the tray table and configured to charge an electronic device wirelessly when the electronic device is within a threshold distance from the wireless charging module. In some aspect of the disclosure, the tray assembly includes the tray table with the at least one wireless charging module and the center bar including at least one electrical outlet. As such, the tray assembly according to various aspects of the disclosure provides a way to conveniently supply electricity to an electronic device, by plugging the electronic device into the outlet of the center bar and/or by placing the electronic device on a location of the tray table that corresponds to the wireless charging module to wireless charge the electronic device.

Figure 2A:
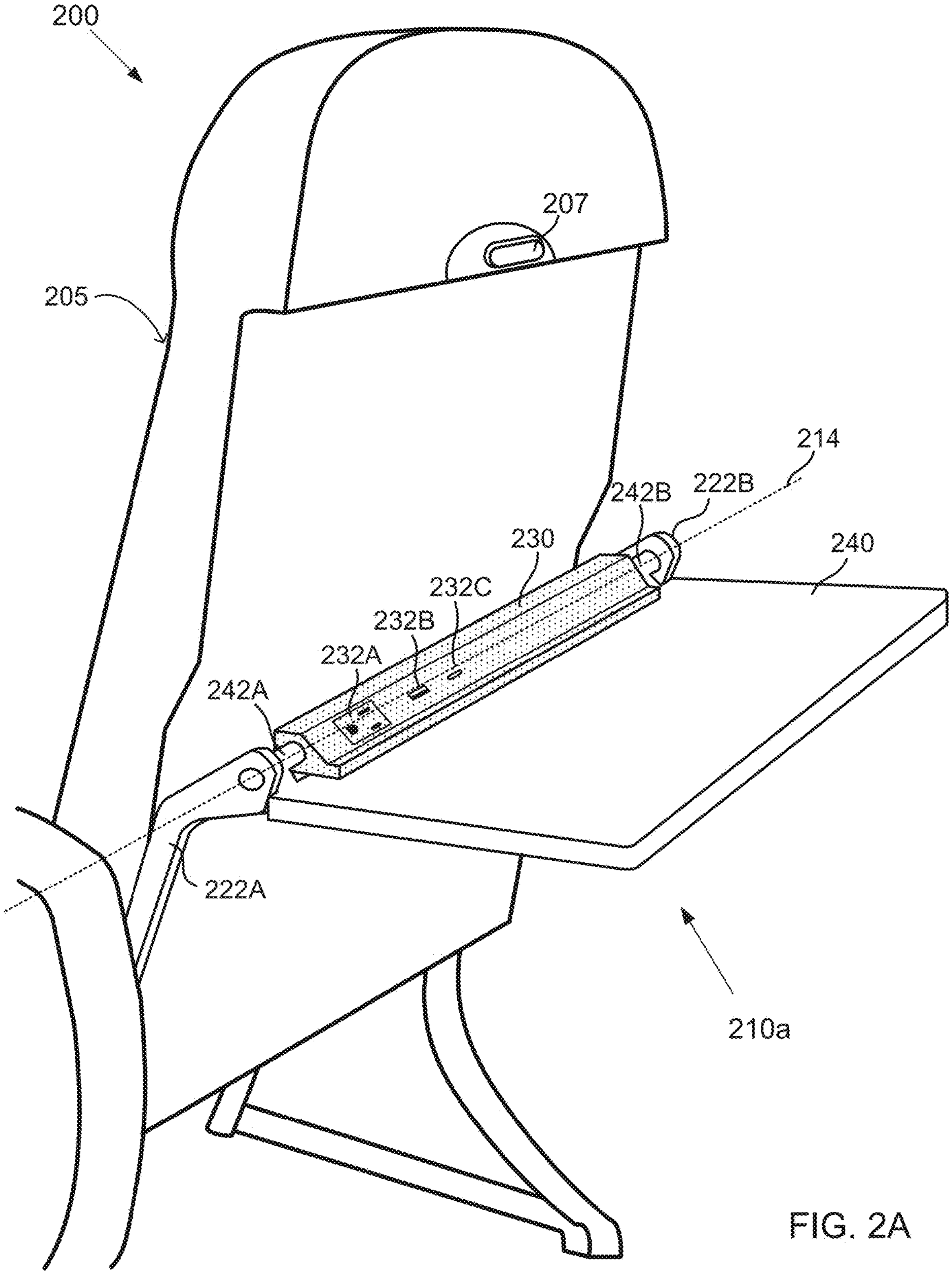
FIG. 2A is an example diagram illustrating a tray assembly installed with a passenger seat of a transportation vehicle, according to some aspects of the disclosure.

FIG. 2A is an example diagram 200 illustrating a tray assembly installed with a passenger seat 205 of a transportation vehicle, according to some aspects of the disclosure. In the example shown in FIG. 2A, a tray assembly *210a* includes at least a tray table 240 and a center bar 230. The tray assembly *210a* may further include a first support arm 222A and a second support arm 222B. The first support arm 222A may be coupled to a left side of the passenger seat 205. The second support arm 222B may be coupled to a right side of the passenger seat 205 and is spaced apart from the first support arm 222A. In some aspects, the first support arm 222A and the second support arm 222B may be pivotably coupled to the left side and the right side of the passenger seat 205, respectively.

The tray table 240 is pivotably coupled to the first support arm 222A at a left corner of the tray table 240 and is further pivotably coupled to the second support arm 222B at a right corner of the tray table 240. Hence, the tray table 240 can be rotated with respect to a rotation axis 214 while being pivotably coupled to the first support arm 222A and the second support arm 222B. In the example shown in FIG. 2A, a first connecting portion 242A of the tray table 240 is rotatably coupled to the first support arm 222A and the left side of the center bar 230, while a second connecting portion 242B of the tray table 240 is rotatably coupled to the second support arm 222B and the right side of the center bar 230.

The tray table 240 is pivotably coupled to the first support arm 222A and the second support arm 222B to pivotably move (e.g., by rotating about the rotation axis 214) between a stow position where the tray table 240 is substantially parallel and anchored to a seatback of the passenger seat 205 and an open position where the tray table 240 is substantially parallel to a floor of the transportation vehicle and released away from the seatback. In the example shown in FIG. 2A, the tray table 240 is in the open position, with the tray table 240 is substantially parallel to the floor, such that a passenger may place an item or food on top of the tray table 240. Further, in an example, the first support arm 222A may be pivotably coupled to the left side of the passenger seat 205, while the second support arm 222B may be pivotably coupled to the right side of the passenger seat 205. The passenger seat 205 may include a locking mechanism 207 to hold the tray table 240 in the stow position.

The center bar 230 is coupled to the first support arm 222A at a first end (e.g., left side) of the center bar 230 and the second support arm 222B at a second end (e.g., right side) of the center bar 230. In particular, in the example shown in FIG. 2A, the center bar 230 is coupled to the first support arm 222A via a first connecting portion 242A on the left side, and is coupled to the second support arm 222B via a second connecting portion 242B on the right side. However, in a different embodiment not shown in FIG. 2A, the center bar 230 may be directly connected to the first support arm 222A on the left side and the second support arm 222B on the right side.

The center bar 230 includes at least one electrical outlet, such as a first electrical outlet 232A, a second electrical outlet 232B, and a third electrical outlet 232C. The first electrical outlet 232A, the second electrical outlet 232B, and the third electrical outlet 232C may be collectively referred to as the electrical outlets 232A, 232B, and 232C. For example, the first electrical outlet 232A is an alternating current (AC) power socket, the second electrical outlet 232B is a universal serial bus (USB) Type-A charging outlet, and the third electrical outlet 232C is a USB Type-C charging outlet. In some aspects, at least one of the first electrical outlet 232A, the second electrical outlet 232B, and the third electrical outlet 232C may include a ground fault circuit interrupter (GFCI). Although the example in FIG. 2A shows that the center bar 230 includes the first electrical outlet 232A, the second electrical outlet 232B, and the third electrical outlet 232C, less than all of the first electrical outlet 232A, the second electrical outlet 232B, and the third electrical outlet 232C may be included in the center bar 230 in another embodiment not shown in FIG. 2A.

In some aspects, each of the electrical outlets 232A, 232B, and 232C may have a sealing mechanism, where opening(s) of the electrical outlets 232A, 232B, and 232C are closed when not in use (e.g., not plugged in). As such, the electrical outlets 232A, 232B, and 232C may be spill-proof to prevent foreign substances (e.g., liquid) from entering the electrical outlets 232A, 232B, and 232C via their openings.

In an aspect, the center bar 230 may be a separate structure from the tray table 240 and may be capable of rotating independent from the tray table 240. For example, the center bar 230 may be pivotably coupled to the tray table 240 (e.g., at the first connecting portion 242A and the second connecting portion 242B), such that the center bar 230 may be moved to a first position where the electrical outlets 232A, 232B, and 232C face substantially upward with respect to the floor when the tray table 240 is in the open position, while the center bar 230 may be moved to a second position where the electrical outlets 232A, 232B, and 232C face substantially downward with respect to the floor when the tray table 240 is in the stow position. In FIG. 2A where the tray table 240 is in the open position, the center bar 230 has been moved to the first position where the electrical outlets 232A, 232B, and 232C face substantially upward with respect to the floor. In another aspect, the center bar 230 may be attached to the tray table 240 or may be integrally formed with the tray table 240, and thus may rotate with the tray table 240.

In some aspects, the at least one electrical outlet may be located at a higher position with respect to the floor than a top surface of the tray table when the tray table is in the open position. For example, as shown in FIG. 2A, the first electrical outlet 232A, the second electrical outlet 232B, and the third electrical outlet 232C are located at a higher position than a top surface of the tray table 240 with respect to the floor when the tray table 240 is in the open position. As such, even if a passenger spills a drink or liquid on the tray table 240, it will be difficult for such spilled liquid to reach the first electrical outlet 232A, the second electrical outlet 232B, and the third electrical outlet 232C, thereby providing safety benefits by minimizing the spilled liquid entering the first electrical outlet 232A, the second electrical outlet 232B, and the third electrical outlet 232C.

Figure 2B:
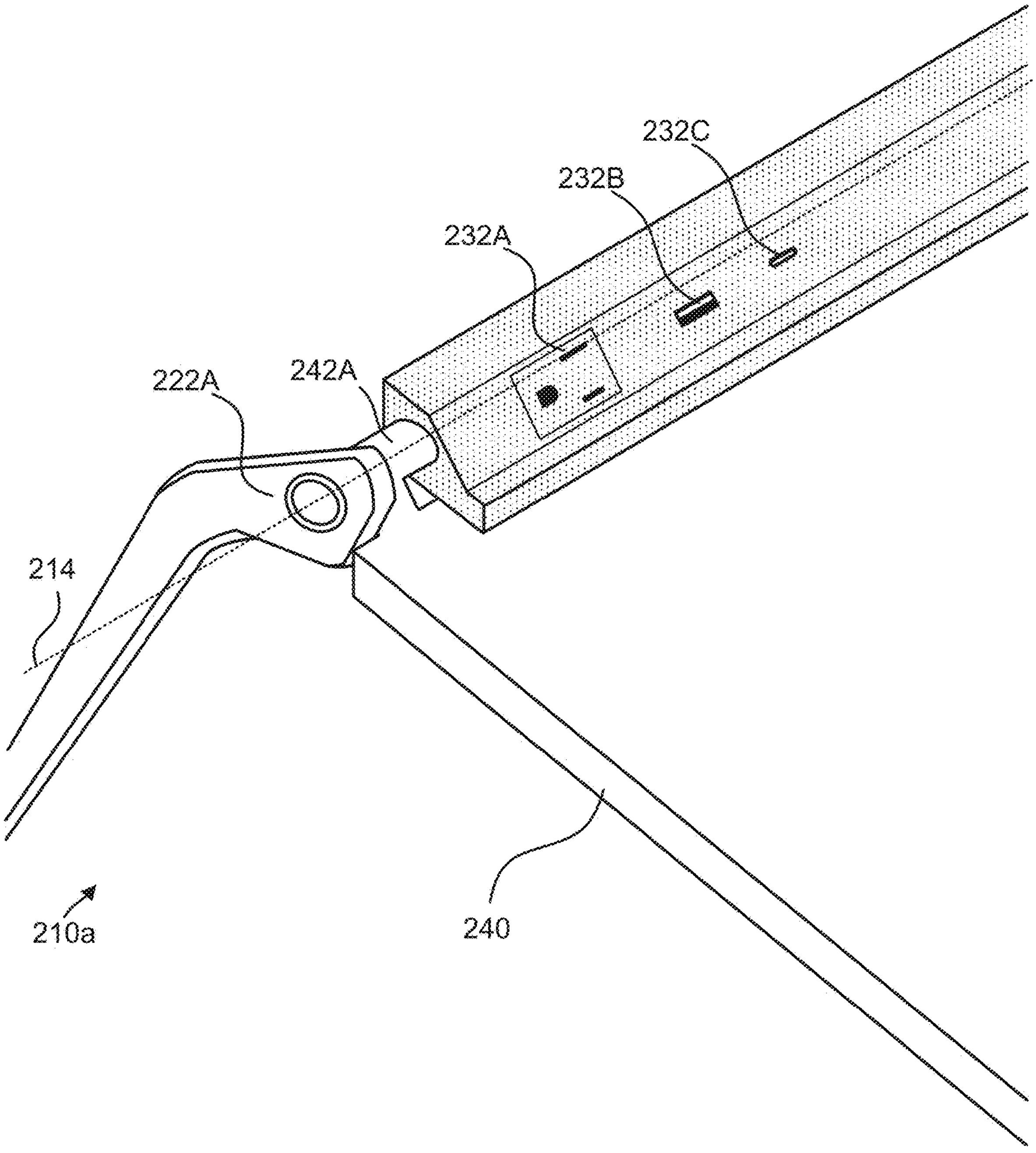
FIG. 2B is an example diagram illustrating a close up perspective view of the tray assembly of FIG. 2A, according to some aspects of the disclosure.
Figure 2C:
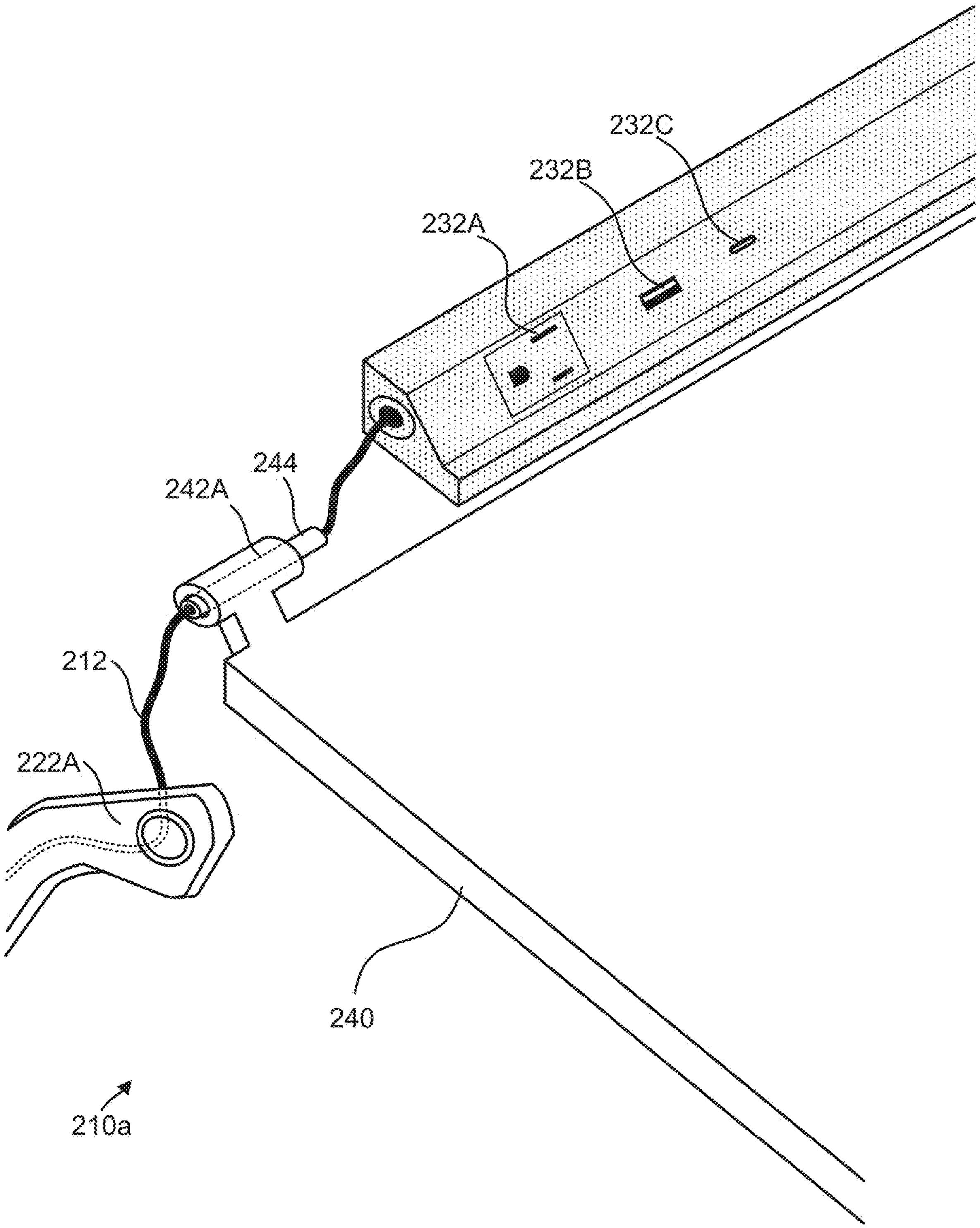
FIG. 2C is an example diagram illustrating a close up perspective view of the tray assembly of FIG. 2A partially disassembled, according to some aspects of the disclosure.

FIG. 2B is an example diagram 200 illustrating a close up perspective view of the tray assembly 210*a* of FIG. 2A, according to some aspects of the disclosure. FIG. 2C is an example diagram illustrating a close up perspective view of the tray assembly 210*a* of FIG. 2A partially disassembled, according to some aspects of the disclosure. The first support arm 222A, the center bar 230 with the electrical outlets 232A, 232B, and 232C and the tray table 240 with the first connecting portion 242A are described in detail above with reference to FIG. 2A, and thus explanations of these parts in FIG. 2B and FIG. 2C are omitted.

FIG. 2C shows the first support arm 222A, the tray table 240, and the center bar 230 disassembled for illustration purposes. A connecting rod 244 may be inserted through the first connecting portion 242A and may be inserted into the center bar 230 and the first support arm 222A, to allow the rotational movements of the tray table 240 and the center bar 230 with respect to the rotation axis 214 when assembled, as shown in FIG. 2A and FIG. 2B.

In some aspects, the first support arm 222A and/or the second support arm 222B may include power line(s) carrying electricity to supply electricity. For example, as shown in FIG. 2C, a power line 212 (e.g., electrical wire(s)) carrying electricity for the electrical outlets 232A, 232B, and 232C as well as the indicator lights 234A, 234B, and 234C may run through the first support arm 222A and through the connecting rod 244 to the center bar 230. The power line 212 may be used to power any electrical parts in the tray assembly 210*a*. For example, the power line 212 may run through the floor to a main power supply that supplies electricity.

Figure 2D:
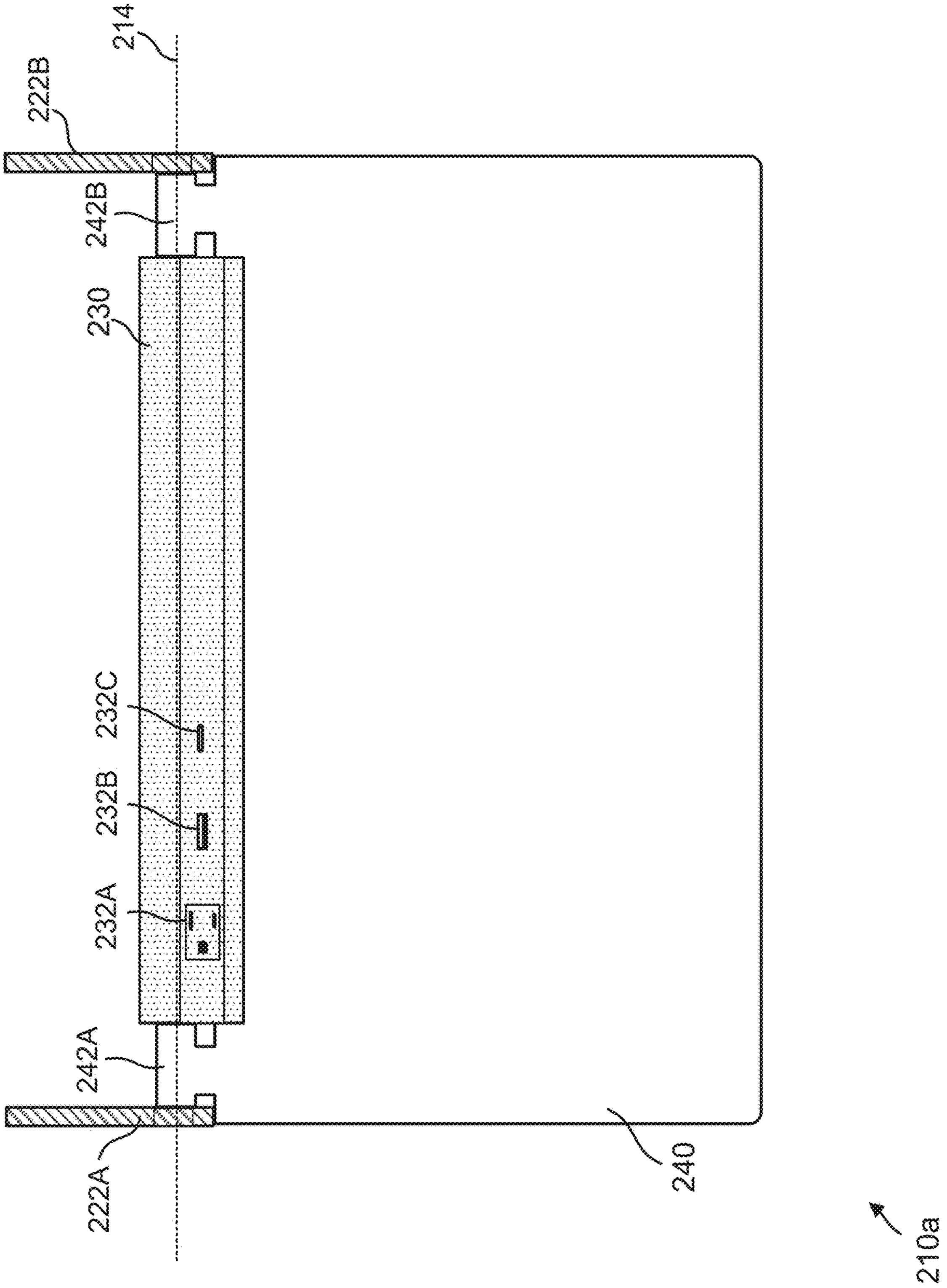
FIG. 2D is an example diagram illustrating a top view of the tray assembly of FIG. 2A, according to some aspects of the disclosure.

FIG. 2D is an example diagram illustrating a top view of the tray assembly 210*a* of FIG. 2A, according to some aspects of the disclosure. The first support arm 222A, the second support arm 222B, the center bar 230 with the electrical outlets 232A, 232B, and 232C and the tray table 240 with the first connecting portion 242A and the second connecting portion 242B are described in detail above with reference to FIG. 2A, and thus detailed explanations of these parts in FIG. 2D are omitted. As shown in FIG. 2D, the tray table 240 is pivotably coupled to the first support arm 222A at the top left corner of the tray table 240 via the first connecting portion 242A and is pivotably coupled to the second support arm 222B at the top right corner of the tray table 240 via the second connecting portion 242B, such that the tray table 240 may rotate with respect to the rotation axis 214. The center bar 230 is also rotatable with respect to the rotation axis 214, as the center bar 230 is also rotatably coupled to the first connecting portion 242A on the left side and the second connecting portion 242B on the right side.

Figure 2E:
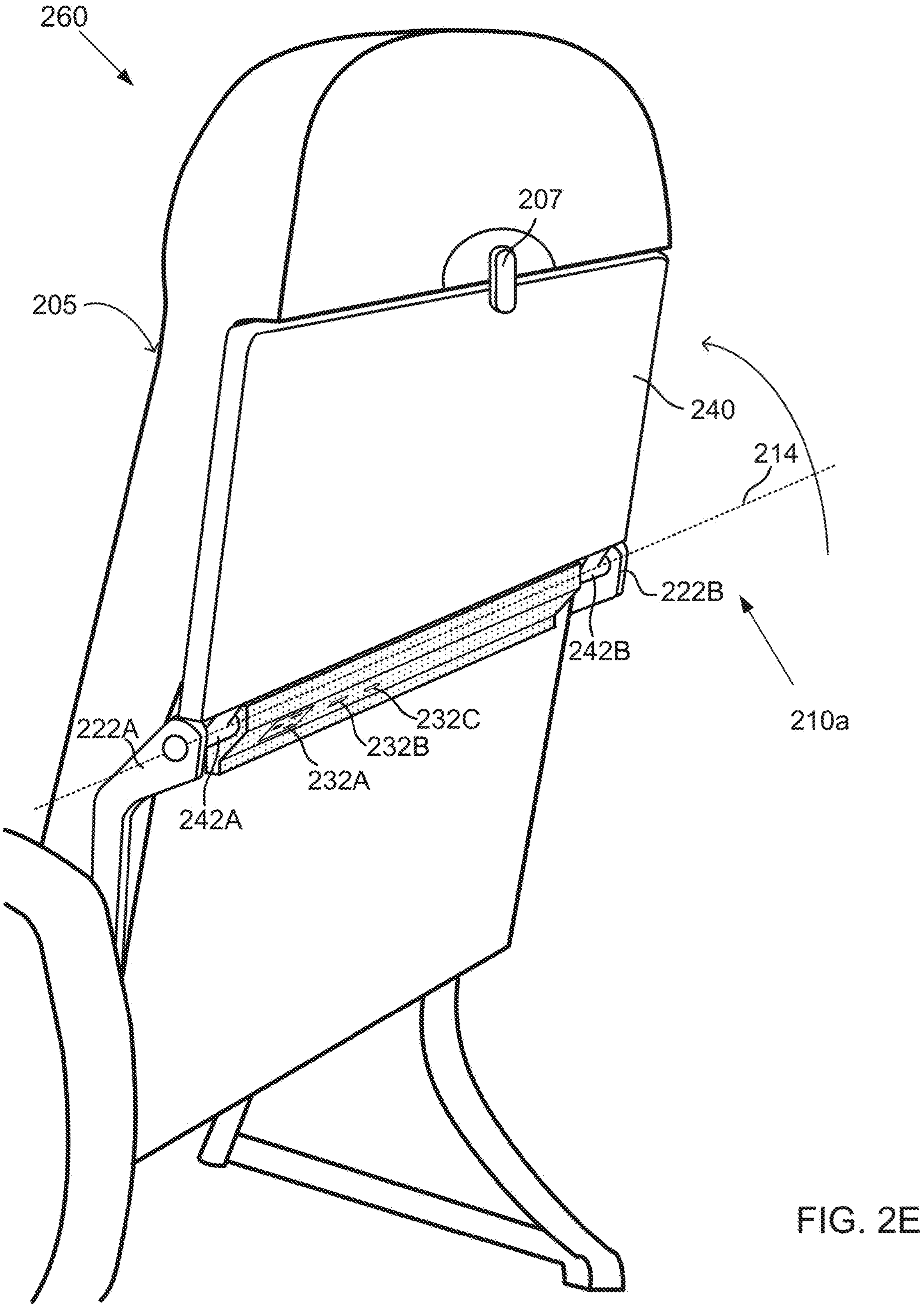
FIG. 2E is an example diagram illustrating the tray assembly installed with the passenger seat, where the tray table is in the stow position, according to some aspects of the disclosure.

FIG. 2E is an example diagram 260 illustrating the tray assembly 210*a* installed with the passenger seat 205, where the tray table 240 is in the stow position, according to some aspects of the disclosure. The first support arm 222A, the second support arm 222B, the center bar 230 with the electrical outlets 232A, 232B, and 232C, and the tray table 240 with the first connecting portion 242A and the second connecting portion 242B are described in detail above with reference to FIG. 2A, and thus explanations of these parts in FIG. 2E are omitted. As shown in FIG. 2E, the tray table 240 is in the stow position where the tray table 240 is substantially parallel and anchored to a seatback of the passenger seat 205 (e.g., via the locking mechanism 207). As discussed above, the tray table 240 is pivotably coupled to the first support arm 222A and the second support arm 222B to pivotably move (e.g., by rotating with respect to the rotation axis 214) between the stow position shown in FIG. 2E and the open position in FIG. 2A. Further, as discussed above, the center bar 230 may also be rotatable with respect to the rotation axis 214.

In some aspects, the at least one electrical outlet is accessible with the tray table in the stow position and is also accessible with the tray table in the open position. The center bar 230 may be rotatable (e.g., with respect to the rotation axis 214) to make the electrical outlets 232A, 232B, and 232C accessible regardless of whether the tray table 240 is in the stow position or in the open position. As such, a passenger may access the electrical outlets 232A, 232B, and 232C both in the stow position of the tray table 240 and in the open position of the tray table 240. In FIG. 2E where the tray table 240 is in the stow position, the center bar 230 has been moved to the second position where the electrical outlets 232A, 232B, and 232C face substantially downward with respect to the floor.

Figure 2F:
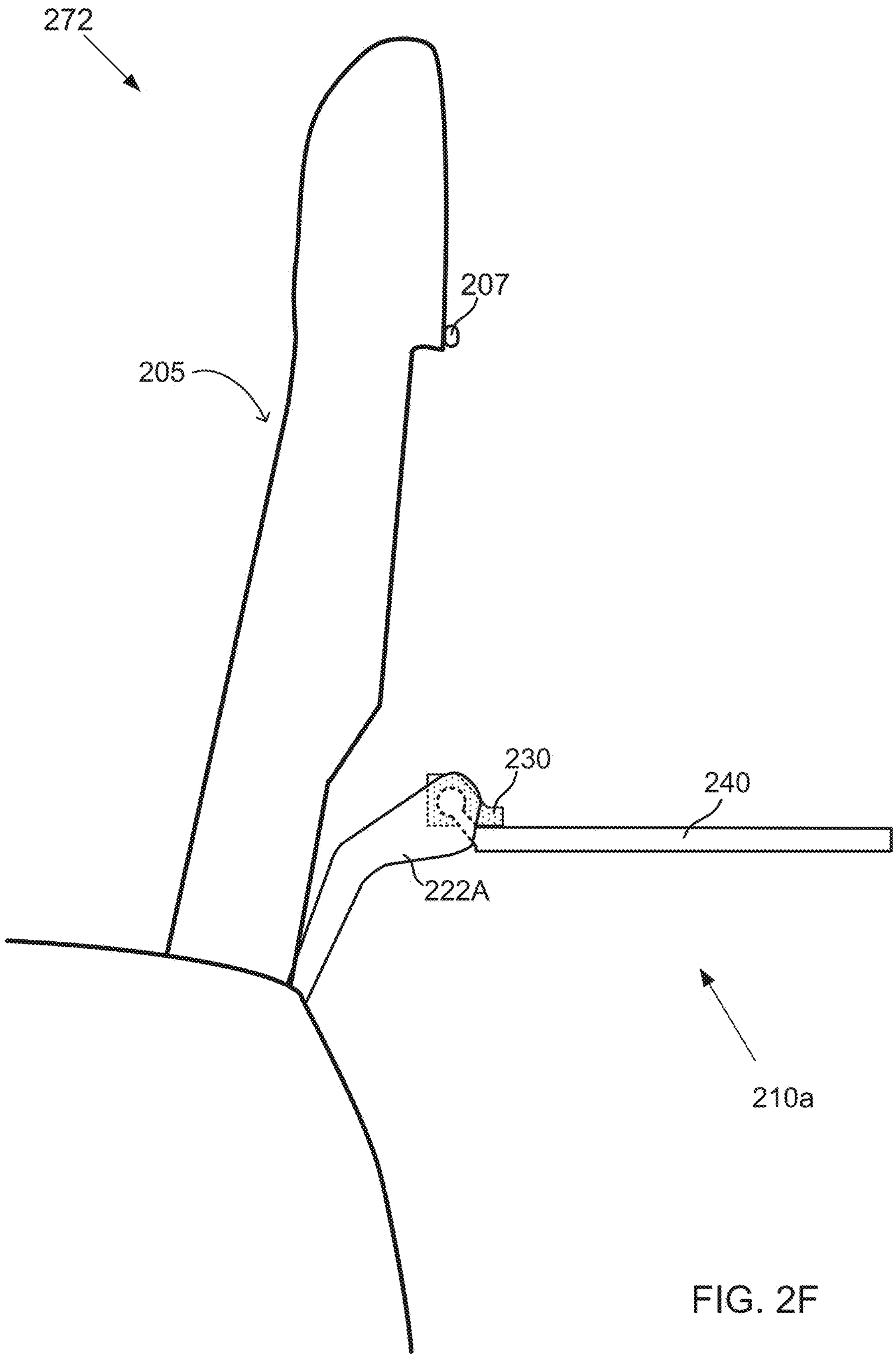
FIG. 2F is an example diagram showing a side view of the tray assembly installed with the passenger seat in the open position, according to some aspects of the disclosure.
Figure 2G:
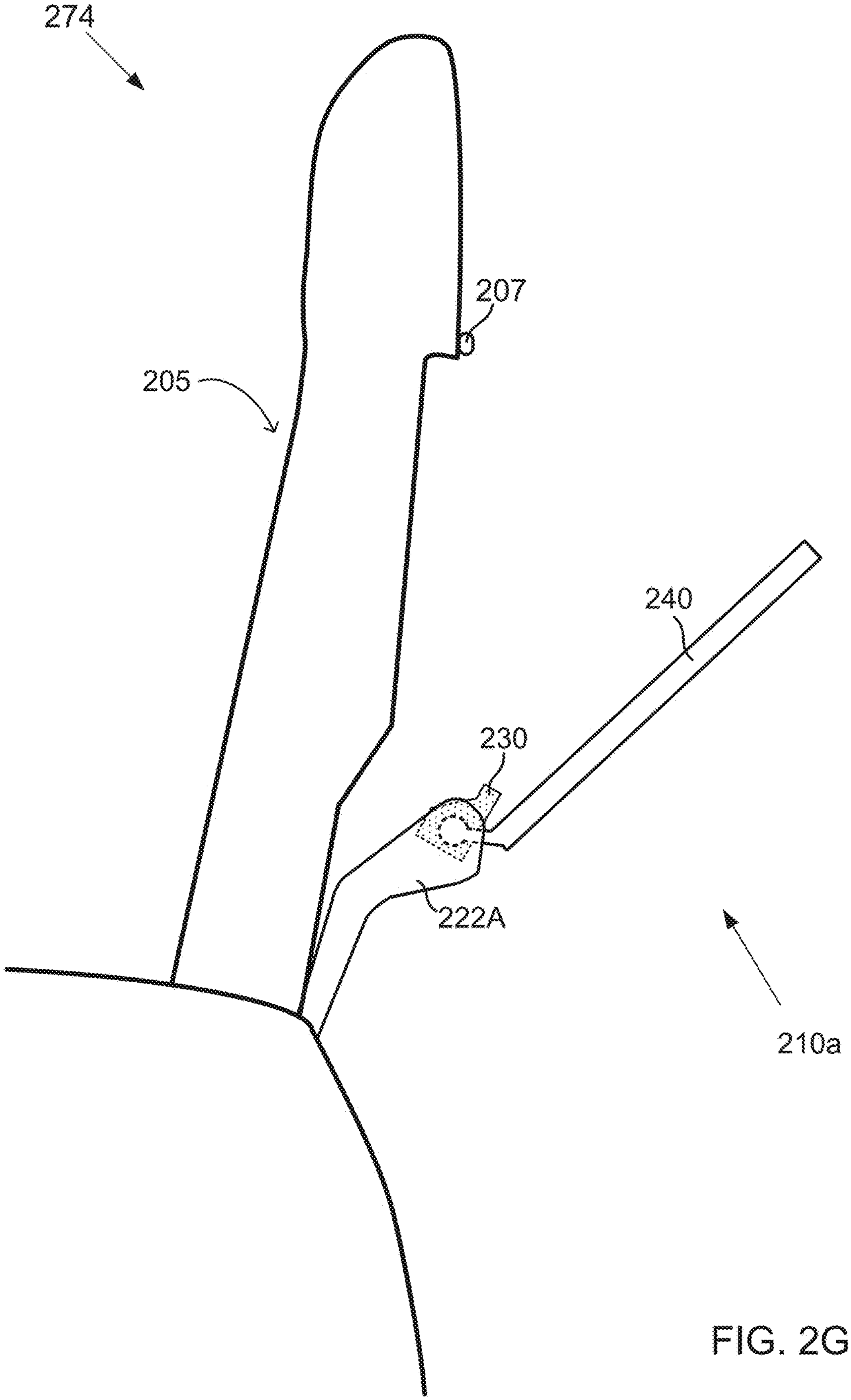
FIG. 2G is an example diagram showing a side view of the tray assembly installed with the passenger seat in a position between the open position and the stow position, according to some aspects of the disclosure.
Figure 2H:
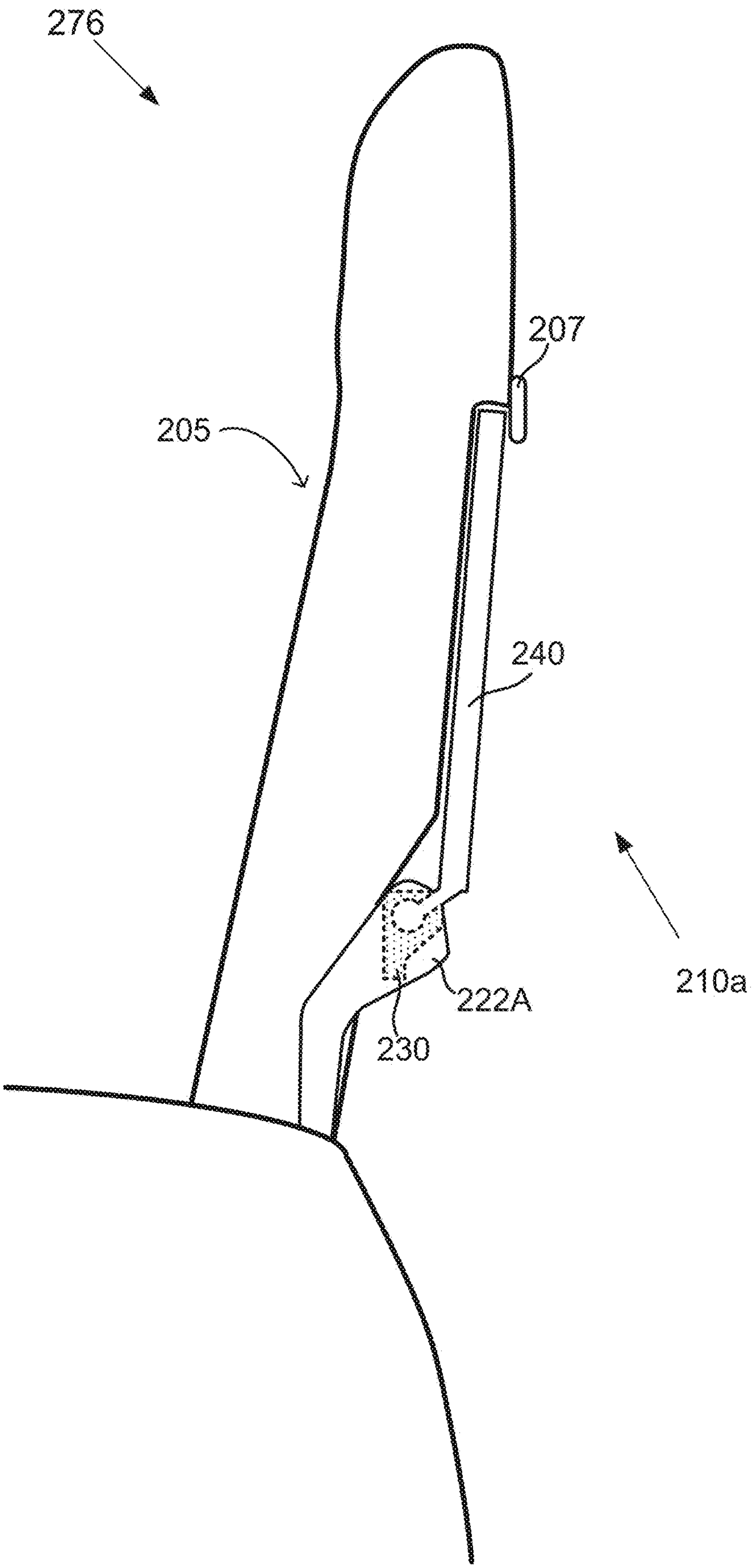
FIG. 2H is an example diagram showing a side view of the tray assembly installed with the passenger seat in the stow position, according to some aspects of the disclosure.

FIG. 2F is an example diagram 272 showing a side view of the tray assembly 210*a* installed with the passenger seat 205 when the tray table 240 is in the open position, according to some aspects of the disclosure. FIG. 2G is an example diagram 274 showing a side view of the tray assembly 210*a* installed with the passenger seat 205 in a position between the open position and the stow position, according to some aspects of the disclosure. FIG. 2H is an example diagram 276 showing a side view of the tray assembly 210*a* installed with the passenger seat 205 when the tray table 240 is in the stow position, according to some aspects of the disclosure. The first support arm 222A, the center bar 230 and the tray table 240 are described in detail above with reference to FIG. 2A and FIG. 2E, and thus explanations of these parts in FIG. 2F, FIG. 2G, and FIG. 2H are omitted. As shown in FIG. 2F, FIG. 2G, and FIG. 2H, the tray table 240 may be moved and rotated between the open position shown in Figure F and the stow position in Figure H. As shown in Figure H, when the tray table 240 is in the stow position, the tray table 240 is substantially parallel and anchored to a seatback of the passenger seat 205 (e.g., via the locking mechanism 207). Further, as shown in FIG. 2F, FIG. 2G, and FIG. 2H, the center bar 230 can be rotated to make the electrical outlets 232A, 232B, and 232C accessible regardless of whether the tray table 240 is in the stow position as shown in Figure H or in the open position as shown in FIG. 2F. In particular, as shown in FIG. 2F, the center bar 230 may be rotated to the first position where the electrical outlets 232A, 232B, and 232C face substantially upward with respect to the floor when the tray table 240 is in the open position. Further as shown in FIG. 2H, the center bar 230 may be rotated to the second position where the electrical outlets 232A, 232B, and 232C face substantially downward with respect to the floor when the tray table 240 is in the stow position.

According to some aspects, various optional features may be implemented, in addition to the features shown in FIG. 2A and FIG. 2E. For example, one or more of the optional features discussed below may be additionally implemented.

Figure 2I:
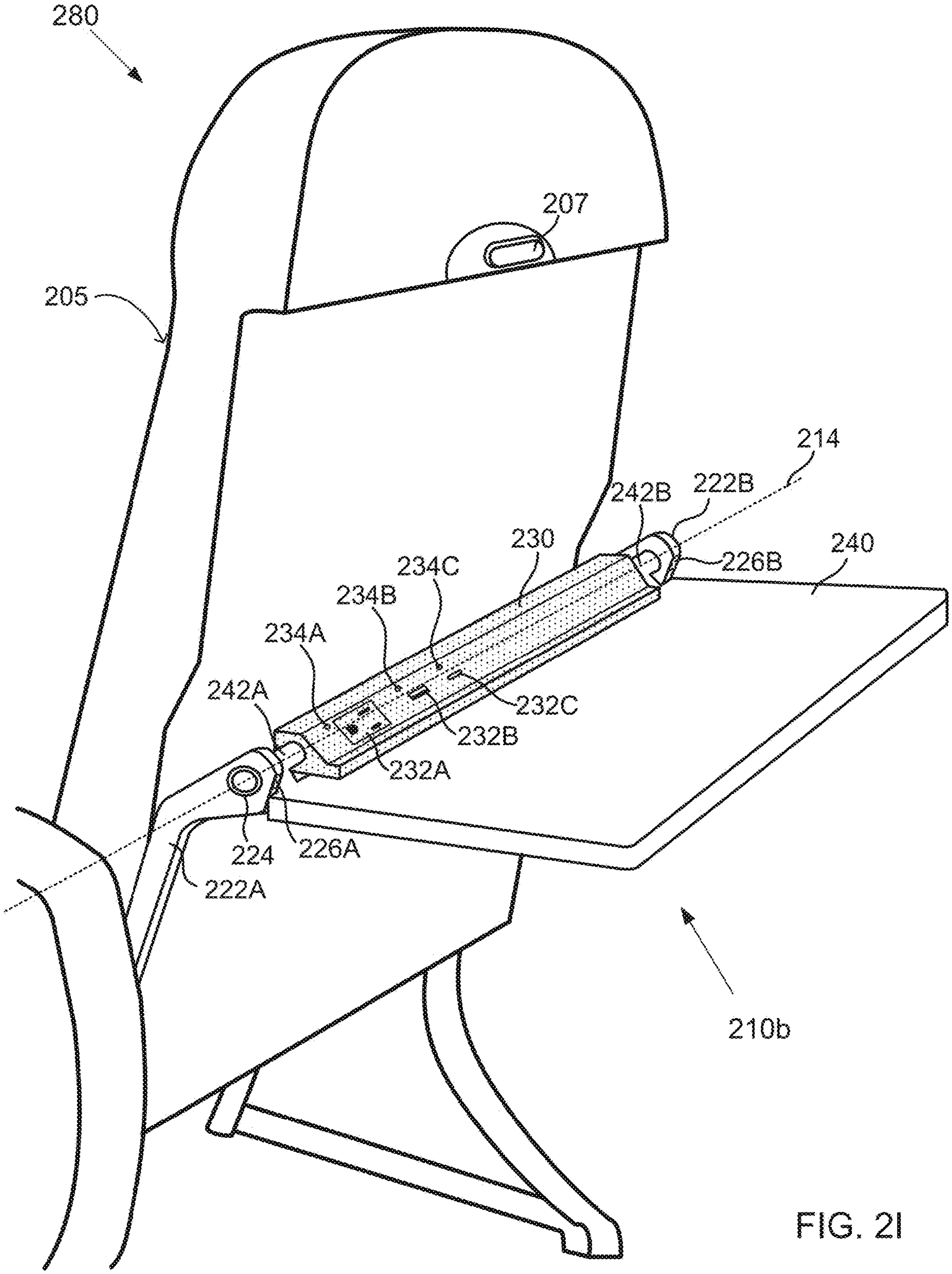
FIG. 2I is an example diagram illustrating a tray assembly installed with the passenger seat of the transportation vehicle, according to some aspects of the disclosure.

FIG. 2I is an example diagram 280 illustrating a tray assembly 210*b* installed with the passenger seat 205 of the transportation vehicle, according to some aspects of the disclosure. The tray assembly 210*b* of FIG. 2I includes the center bar 230 with the electrical outlets 232A, 232B, and 232C and the tray table 240 with the first connecting portion 242A and the second connecting portion 242B, and further includes optional feature(s) as discussed below. The tray assembly 210*b* may further include the first support arm 222A and the second support arm 222B. The first support arm 222A, the second support arm 222B, the center bar 230 with the electrical outlets 232A, 232B, and 232C and the tray table 240 with the first connecting portion 242A and the second connecting portion 242B are described in detail above with reference to FIG. 2A, and thus explanations of these parts in FIG. 2I are omitted.

In some aspects, the tray assembly may further include a position detector component configured to detect whether the tray table is in the stow position or in the open position. For example, as shown in FIG. 2I, the tray assembly 210*b* may optionally include a position detector component 224 configured to detect whether the tray table 240 is in the stow position or in the open position. In an example, the position detector component 224 may be a device that activates or deactivate a switch depending on which position the tray table 240 is in. The example of FIG. 2I shows the position detector component 224 implemented in the first support arm 222A. However, in another example not shown in FIG. 2I, the position detector component 224 may be implemented in a different portion of the tray assembly 210*b*. In an example, the position detector component may be a mechanical device having parts that move to trigger a switch as on the tray table 240 moves to change a position. In another example, the position detector component 224 may be based on an electrical contact where the tray table 240 in one position causes an electrical contact and the tray table 240 in another position causes no electrical contact.

In some aspects, the tray assembly may further include a lighting device configured to illuminate a surrounding area of the tray assembly when activated. For example, as shown in FIG. 2I, the tray assembly 210*b* may optionally include lighting devices 226A and 226B configured to illuminate a surrounding area of the tray assembly 210*b* when activated.

In some aspects, the at least one electrical outlet includes at least one alternating current (AC) outlet and at least one direct current (DC) outlet. For example, as shown in FIG. 2I, the center bar 230 includes the first electrical outlet 232A that is an AC outlet and further includes the second electrical outlet 232B and the third electrical outlet 232C that are DC outlets.

In some aspects, the tray assembly may include at least one indicator light indicating whether electricity to the at least one AC outlet is activated or deactivated. For example, in FIG. 2I, the tray assembly 210*b* may optionally include a first indicator light 234A indicating whether electricity to the first electrical outlet 232A being the AC outlet is activated or deactivated. Further, the tray assembly 210*b* may optionally include a second indicator light 234B indicating whether electricity to the second electrical outlet 232B is activated or deactivated and a third indicator light 234C indicating whether electricity to the third electrical outlet 232C is activated or deactivated. The first indicator light 234A, the second indicator light 234B, and the third indicator light 234C may be collectively referred to as indicator lights 234A, 234B, and 234C. In an example, the first indicator light 234A may illuminate when the AC outlet is activated (e.g., with electricity being supplied to the AC outlet), and may turn off when the AC outlet is deactivated (e.g., with no electricity being supplied to the AC outlet). In an example, the second indicator light 234B and the third indicator light 234C may illuminate when the DC outlet is activated to supply DC electricity to the second electrical outlet 232B and the third electrical outlet 232C. In an example, the indicator lights 234A, 234B, and 234C illuminate if the position detector component 224 turns on a switch to turn on electricity to the electrical outlets 232A, 232B. and 232C, and the indicator lights 234A, 234B, and 234C turn off if the position detector component 224 turns off the switch to turn off electricity to the electrical outlets 232A, 232B. and 232C.

The example shown in FIG. 2I illustrate that the indicator lights 234A, 234B, and 234C are implemented in the center bar 230. However, in another example not shown in FIG. 2I, the indicator lights 234A, 234B, and 234C may be implemented in another part of the tray assembly 210*b*, such as the tray table 240.

Figure 2J:
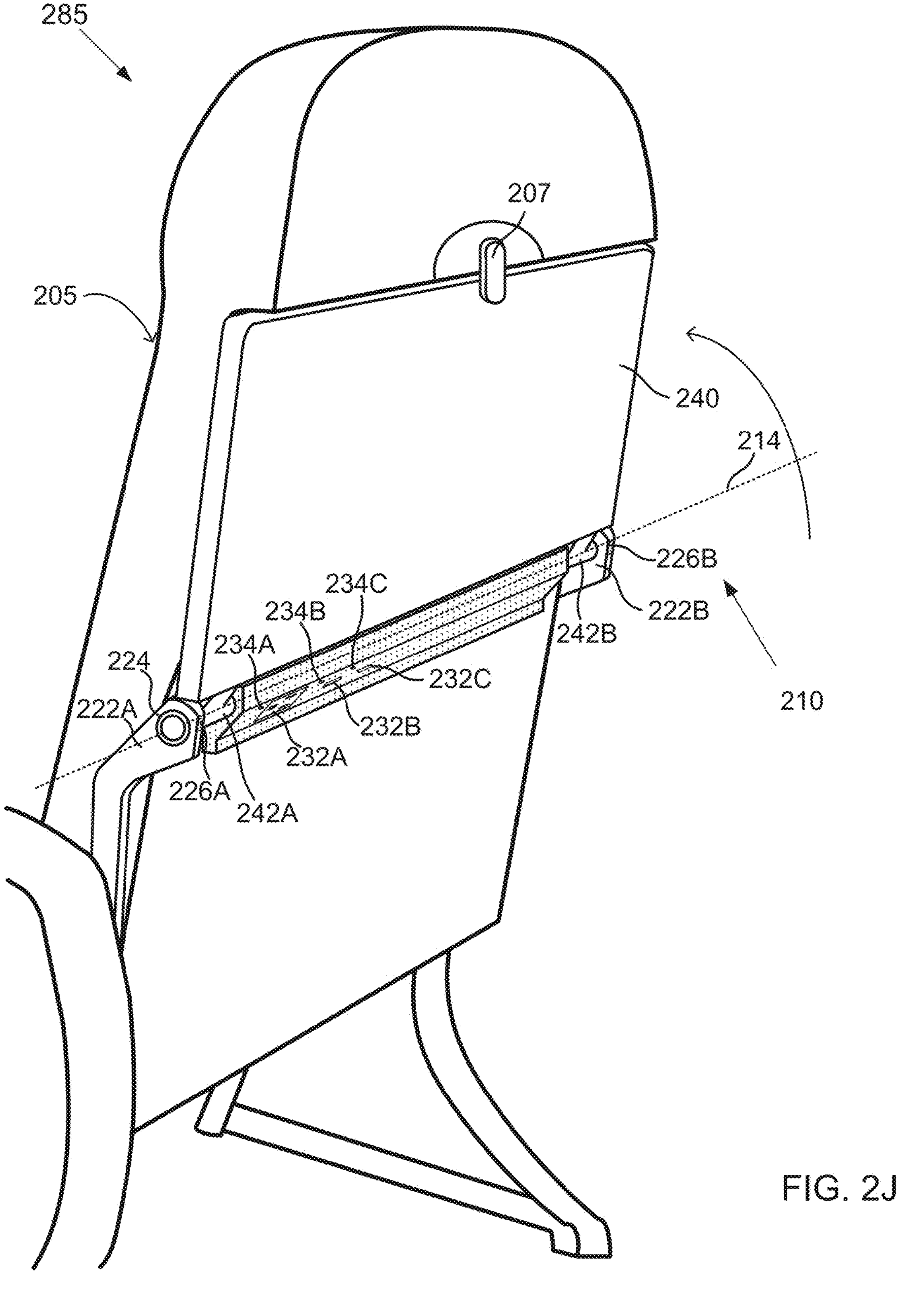
FIG. 2J is an example diagram illustrating the tray assembly installed with the passenger seat of a transportation vehicle, where the tray table is in the stow position, according to some aspects of the disclosure.

FIG. 2J is an example diagram 285 illustrating the tray assembly 210*b* installed with the passenger seat 205 of a transportation vehicle, where the tray table 240 is in the stow position, according to some aspects of the disclosure. The first support arm 222A, the second support arm 222B, the center bar 230 with the electrical outlets 232A, 232B, and 232C and the tray table 240 with the first connecting portion 242A and the second connecting portion 242B are described in detail above with reference to FIG. 2A and FIG. 2E, and thus explanations of these parts in FIG. 2J are omitted. As shown in FIG. 2J, the tray table 240 is in the stow position where the tray table 240 is substantially parallel and anchored to a seatback of the passenger seat 205 (e.g., via the locking mechanism 207). As discussed above, the tray table 240 is pivotably coupled to the first support arm and the second support arm to pivotably move (e.g., by rotating about the rotation axis 214) between the stow position shown in FIG. 2J and the open position in FIG. 2I. Further, as discussed above, the center bar 230 may also be rotatable with respect to the rotation axis 214.

In some aspects, the position detector component may be configured to turn off electricity to the at least one electrical outlet in response to sensing that the tray table is in the stow position (e.g., as shown in FIG. 2J), and may be configured to turn on electricity to the at least one electrical outlet in response to sensing that the tray table is in the open position (e.g., as shown in FIG. 2I). In one example, electricity is provided to the electrical outlets 232A, 232B, and 232C when the tray table 240 being in the open position (e.g., as shown in FIG. 2I) causes the position detector component 224 to activate a switch to provide the power the electrical outlets 232A, 232B, and 232C, while the tray table 240 being in the stow position (e.g., as shown in FIG. 2J) causes the position detector component 224 to deactivate the switch and thus cutting off electricity to the electrical outlets 232A, 232B, and 232C. In this aspect, by cutting off the power to the electrical outlets 232A, 232B, and 232C when the tray table 240 is in the stow position, additional safety measures regarding the electrical outlets 232A, 232B, and 232C may be implemented when a passenger places the tray table 240 in the stow position and is less likely to utilize the electrical outlets 232A, 232B, and 232C than when the tray table 240 is in the open position.

In another aspect, electricity may be provided to the electrical outlets 232A, 232B, and 232C regardless of whether the tray table 240 is in the stow position (e.g., as shown in FIG. 2J) or in the open position (e.g., as shown in FIG. 2I). In this aspect, the electrical outlets 232A, 232B, and 232C are accessible with the tray table 240 in the stow position and are also accessible with the tray table 240 in the open position. In the example shown in FIG. 2I and FIG. 2J, when moving the tray table 240 from the open position to the stow position, the center bar 230 can be rotated with respect to the rotation axis 214 to the position shown in FIG. 2J, such that the electrical outlets 232A, 232B, and 232C can be accessible when the tray table 240 is in the stow position. Similarly, when moving the tray table 240 from the stow position to the open position, the center bar 230 can be rotated with respect to the rotation axis 214 to the position shown in FIG. 2I, such that the electrical outlets 232A, 232B, and 232C can be accessible when the tray table 240 is in the open position. Hence, in some aspects, the center bar is rotatable to make the at least one electrical outlet accessible regardless of whether the tray table is in the stow position or in the open position.

In some aspects where the tray assembly includes a lighting device configured to illuminate a surrounding area of the tray assembly, the position detector component may be configured to activate the lighting device in response to sensing that the tray table is in the stow position, and may be configured to deactivate the lighting device in response to sensing that the tray table is in the open position. For example, as shown in FIG. 2I and FIG. 2J, the tray assembly 210*b* may optionally include lighting devices 226A and 226B, where the lighting devices 226A and 226B may illuminate the surrounding area of the tray assembly 210*b* (e.g., around the tray table 240) when activated. In this example, the position detector component 224 activates the lighting devices 226A and 226B when the position detector component 224 senses that the tray table 240 is in the open position, while the position detector component 224 deactivates the lighting devices 226A and 226B to turn them off when the position detector component 224 senses that the tray table 240 is in the stow position. In the example shown in FIG. 2J, the tray table 240 is in the stow position, and thus the lighting devices 226A and 226B are deactivated and turned off. On the other hand, in the example shown in FIG. 2I, the tray table 240 is in the open position, and thus the lighting devices 226A and 226B are activated and thus illuminates the surrounding area. In the example shown in FIG. 2I and FIG. 2J, the lighting devices 226A and 226B are implemented with the first support arm 222A and the second support arm 222B, respectively. However, in another example not shown in FIG. 2J, the lighting devices may be implemented in a different part of the tray assembly 210*b*, such as the center bar 230 and/or the tray table 240.

In some aspects where the at least one electrical outlet includes at least one AC outlet and at least one DC outlet, the position detector component may be configured to turn off electricity to the at least one AC outlet in response to sensing that the tray table is in the stow position, and may be configured to turn on electricity to the at least one AC outlet in response to sensing that the tray table is in the open position. For example, as shown in FIG. 2I and FIG. 2J, the center bar 230 incudes the first electrical outlet 232A that is an AC outlet and further includes the second electrical outlet 232B and the third electrical outlet 232C that are DC outlets. In one example, the position detector component 224 may turn off electricity to the first electrical outlet 232A being the AC outlet when the position detector component 224 senses that the tray table 240 is in the stow position (e.g., as shown in FIG. 2J), and may turn on electricity to the first electrical outlet 232A being the AC outlet when the position detector component 224 senses that the tray table 240 is in the open position (e.g., as shown in FIG. 2I). In this example, electricity may be supplied to the second electrical outlet 232B and the third electrical outlet 232C that are DC outlets regardless of whether the tray table 240 is in the stow position or the open position according to the sensing by the position detector component 224. In another different example, electricity may be supplied to all of the outlets including the first electrical outlet 232A, the second electrical outlet 232B, and the third electrical outlet 232C regardless of whether the tray table 240 is in the stow position or the open position according to the sensing by the position detector component 224.

In some aspects, the tray assembly may include at least one indicator light indicating whether electricity to the at least one AC outlet is activated or deactivated. For example, in FIG. 2I and FIG. 2J, the tray assembly 210*b* may optionally include an indicator light 234 indicating whether electricity to the first electrical outlet 232A being the AC outlet is activated or deactivated. For example, the indicator light 234 may illuminate when the AC outlet is activated (e.g., with electricity being supplied to the AC outlet), and may turn off when the AC outlet is deactivated activated (e.g., with no electricity being supplied to the AC outlet). Hence, in an example, the indicator light 234 illuminates if the position detector component 224 turns on electricity to the first electrical outlet 232A being the AC outlet, and the indicator light 234 turns off if the position detector component 224 turns off electricity to the first electrical outlet 232A being the AC outlet. The example shown in FIG. 2I and FIG. 2J illustrate that the indicator light 234 is implemented in the center bar 230. However, in another example, the indicator light 234 may be implemented in another part of the tray assembly 210*b*, such as the first electrical outlet 232A or the tray table 240.

In some aspects, the tray table may include at least one wireless charging module embedded within the tray table. Here, the at least one wireless charging module is configured to charge an electronic device wirelessly when the electronic device is within a threshold distance from the at least one wireless charging module.

Figure 2K:
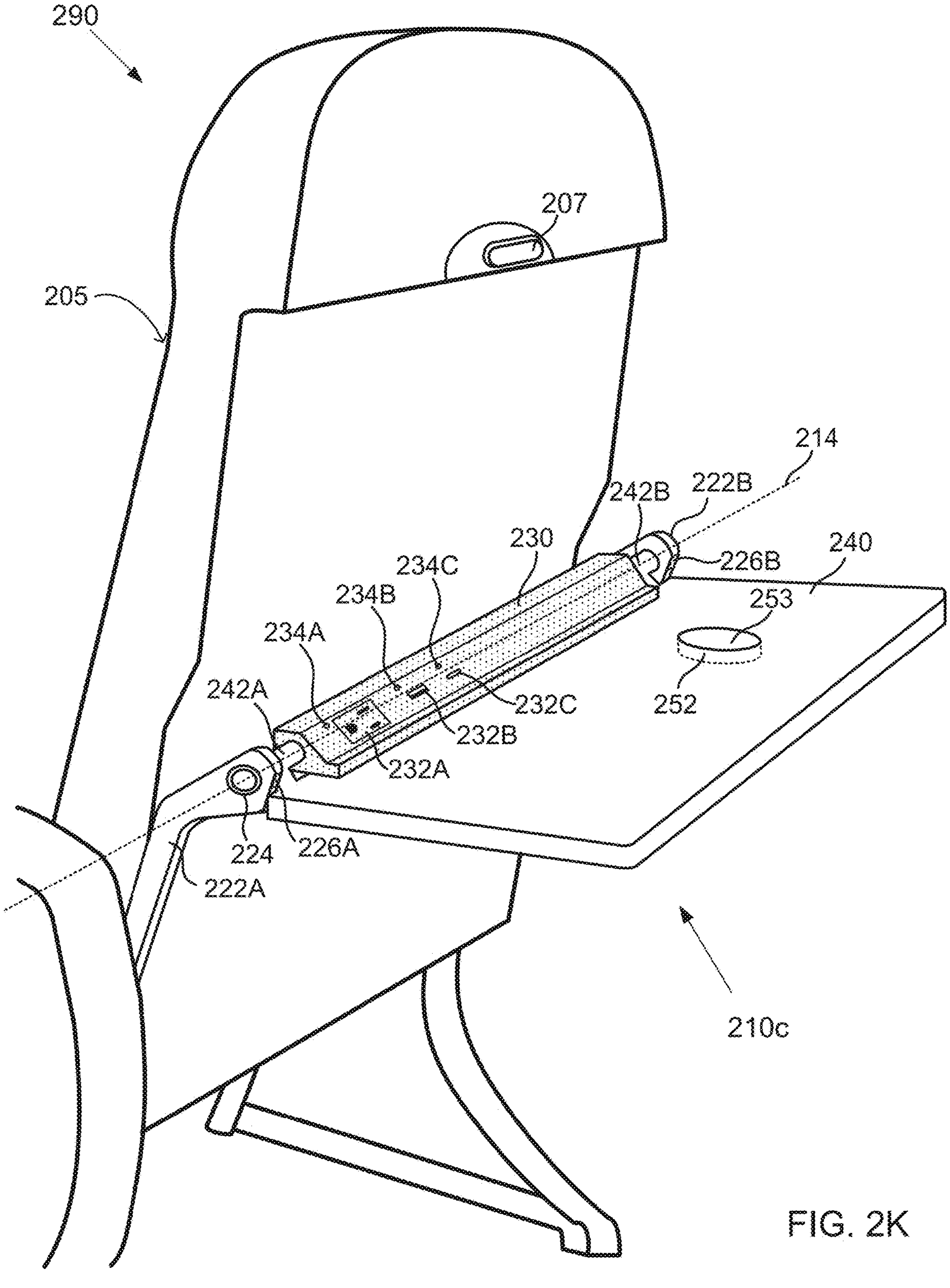
FIG. 2K is an example diagram illustrating a tray assembly installed with the passenger seat of the transportation vehicle, according to some aspects of the disclosure.

FIG. 2K is an example diagram 290 illustrating a tray assembly 210*c* installed with the passenger seat 205 of the transportation vehicle, according to some aspects of the disclosure. The tray assembly 210*c* of FIG. 2K includes the first support arm 222A, the second support arm 222B, the center bar 230 with the electrical outlets 232A, 232B, and 232C and the tray table 240 with the first connecting portion 242A and the second connecting portion 242B. The tray assembly 210*c* of FIG. 2K may further include one or more of the position detector component 224, lighting devices 226A and 226B, and the indicator lights 234A, 234B, and 234C. The tray assembly 210*c* of FIG. 2K may further includes optional feature(s) as discussed below. The first support arm 222A, the second support arm 222B, the center bar 230 with the electrical outlets 232A, 232B, and 232C, the tray table 240 with the first connecting portion 242A and the second connecting portion 242B, the position detector component 224, lighting devices 226A and 226B, and the indicator lights 234A. 234B, and 234C are described in detail above with reference to FIG. 2A and FIG. 2I, and thus explanations of these parts in FIG. 2K are omitted.

In some aspects, the at least one wireless charging module may include a first wireless charging module configured to wirelessly charge the electronic device when the electronic device is within the threshold distance from the first wireless charging module by contacting a first charging area on a top surface of the tray table, the top surface being a surface on a top side of the tray table with respect to the floor when the tray table is in the open position, where a location of the first charging area corresponds to a location of the first wireless charging module embedded within the tray table.

For example, as shown in FIG. 2K, the tray table 240 may include a first wireless charging module 252 embedded within the tray table 240 and configured to charge an electronic device wirelessly when the electronic device is within a threshold distance from the first wireless charging module 252. In particular, the electronic device may be placed on a first charging area 253 on a top surface of the tray table 240 to contact the first charging area 253, where a location of the first charging area 253 corresponds to a location of the first wireless charging module 252. By contacting the first charging area 253, the electronic device may be within the threshold distance from the first wireless charging module 252 to wireless charge the electronic device via the first wireless charging module 252.

Figure 2L:
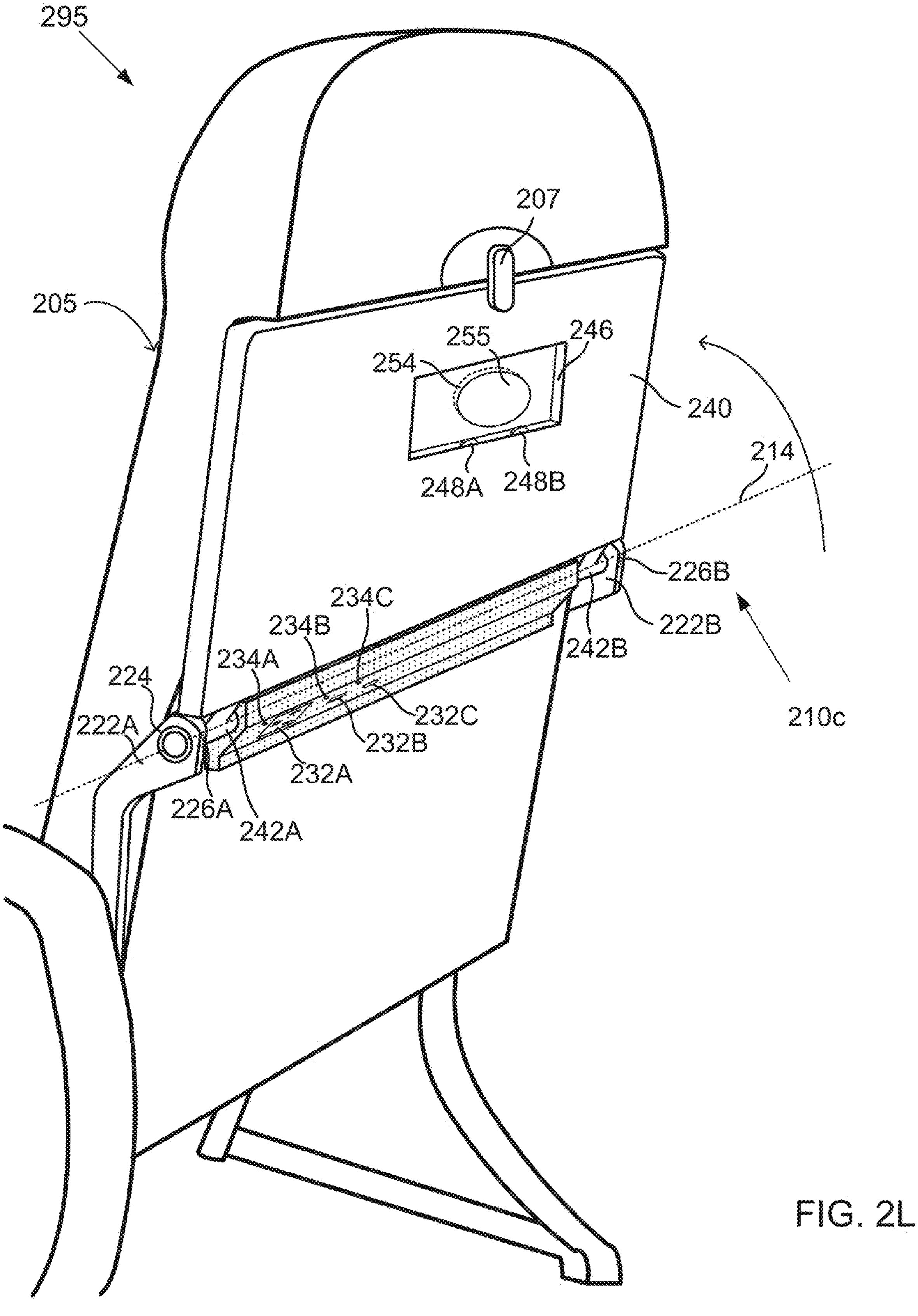
FIG. 2L is an example diagram illustrating the tray assembly installed with the passenger seat of a transportation vehicle, where the tray table is in the stow position, according to some aspects of the disclosure.

FIG. 2L is an example diagram 295 illustrating the tray assembly 210*c* installed with the passenger seat 205 of a transportation vehicle, where the tray table 240 is in the stow position, according to some aspects of the disclosure. The first support arm 222A, the second support arm 222B, the center bar 230 with the electrical outlets 232A, 232B, and 232C and the tray table 240 with the first connecting portion 242A and the second connecting portion 242B, the position detector component 224, lighting devices 226A and 226B, and the indicator lights 234A. 234B, and 234C are described in detail above with reference to FIG. 2A, FIG. 2E, FIG. 2I, and FIG. 2J, and thus explanations of these parts in FIG. 2L are omitted. As shown in FIG. 2L, the tray table 240 is in the stow position where the tray table 240 is substantially parallel and anchored to a seatback of the passenger seat 205 (e.g., via the locking mechanism 207). As discussed above, the tray table 240 is pivotably coupled to the first support arm and the second support arm to pivotably move (e.g., by rotating about the rotation axis 214) between the stow position shown in FIG. 2L and the open position in FIG. 2K. Further, as discussed above, the center bar 230 may also be rotatable with respect to the rotation axis 214.

In some aspects, the at least one wireless charging module may include a second wireless charging module configured to wirelessly charge the electronic device when the electronic device is within the threshold distance from the second wireless charging module by contacting a second charging area on a bottom surface of the tray table, the bottom surface being a surface on a bottom side of the tray table facing the floor when the tray table is in the open position. In an aspect, a location of the second charging area corresponds to a location of the second wireless charging module.

For example, as shown in FIG. 2L, the tray table 240 may include a second wireless charging module 254 embedded within the tray table 240 and configured to charge an electronic device wirelessly when the electronic device is within a threshold distance from the second wireless charging module 254. In particular, the electronic device may be placed on or near a second charging area 255 on a bottom surface of the tray table 240, where a location of the second charging area 255 corresponds to a location of the second wireless charging module 254. By contacting or nearly contacting the second charging area 255, the electronic device may be within the threshold distance from the second wireless charging module 254 to wireless charge the electronic device via the second wireless charging module 254.

In some aspects, the tray assembly 210*c* may include both the first wireless charging module 252 and the second wireless charging module 254. In another aspect, the tray assembly 210*c* may include either the first wireless charging module 252 or the second wireless charging module 254.

In an aspect, the tray assembly may further include a device holding structure configured to hold the electronic device close to the second charging area to wirelessly charge the electronic device. For example, as shown in FIG. 2L, a device holding structure 246 with device holders 248A and 248B may be implemented to hold the electronic device close to the second charging area 255 within the threshold distance to wireless charge the electronic device. In particular, in the example of FIG. 2L, the device holding structure 246 may be a holding recess to receive the electronic device, and the electronic device may be held within the holding recess by the device holders 248A and 248B such that the electronic device may be within the threshold distance from the second wireless charging module 254. With the device holding structure holding the electronic device, a passenger may wireless charge the electronic device using the second wireless charging module 254 and view the electronic device at the same time.

As discussed above. in some aspects, the first support arm 222A and/or the second support arm 222B may include power line(s) carrying electricity to supply electricity. For example, the power line 212 running through the first support arm 222A as shown in FIG. 2C may carry electricity to a wireless charging module in the tray assembly 210*c*. In another example, a power line may run through the second support arm 222B and may be connected to the wireless charging module in the tray assembly 210*c* to provide electricity.

Figure 3A:
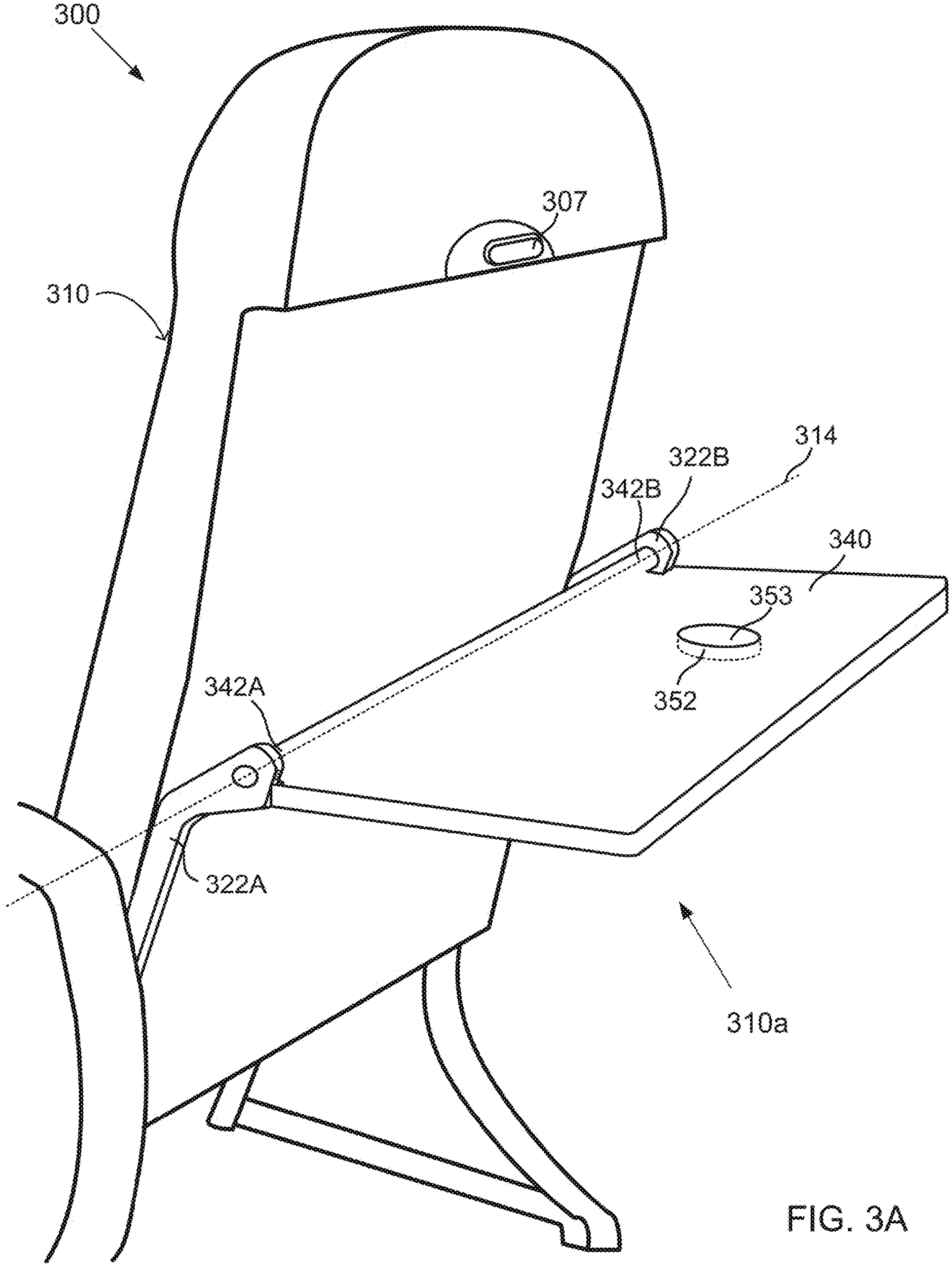
FIG. 3A is an example diagram illustrating a tray assembly installed with a passenger seat of a transportation vehicle, according to some aspects of the disclosure.

FIG. 3A is an example diagram 300 illustrating a tray assembly installed with a passenger seat 305 of a transportation vehicle, according to some aspects of the disclosure. In the example shown in FIG. 3A, a tray assembly 310*a* includes a tray table 340. The tray assembly 310*a* may further include a first support arm 322A and a second support arm 322B. The first support arm 322A is coupled to a left side of the passenger seat 305. The second support arm 322B is coupled to a right side of the passenger seat 305 and is spaced apart from the first support arm 322A. The tray table 340 is pivotably coupled to the first support arm 322A at a left corner of the tray table 340 and is further pivotably coupled to the second support arm 322B at a right corner of the tray table 340. Hence, the tray table 340 can be rotated about a rotation axis 314 while being pivotably coupled to the first support arm 322A and the second support arm 322B.

The tray table 340 is pivotably coupled to the first support arm and the second arm to pivotably move (e.g., by rotating about the rotation axis 314) between a stow position where the tray table 340 is substantially parallel and anchored to a seatback of the passenger seat 305 and an open position where the tray table 340 is substantially parallel to a floor of the transportation vehicle and released away from the seatback. In the example shown in FIG. 3A, the tray table 340 is in the open position, with the tray table 340 is substantially parallel to the floor, such that a passenger may place an item or food on top of the tray table 340. Further, in an example, the first support arm 322A may be pivotably coupled to the left side of the passenger seat 305, while the second support arm 322B may be pivotably coupled to the right side of the passenger seat 305. The passenger seat 305 may include a locking mechanism 307 to hold the tray table 340 in the stow position.

Further, as shown in FIG. 3A, the tray table 340 may include a first wireless charging module 352 embedded within the tray table 340 and configured to charge an electronic device wirelessly when the electronic device is within a threshold distance from the first wireless charging module 352. In particular, the electronic device may be placed on a first charging area 353 on a top surface of the tray table 340 to contact the first charging area 353, where a location of the first charging area 353 corresponds to a location of the first wireless charging module 352. By contacting the first charging area 353, the electronic device may be within the threshold distance from the first wireless charging module 352 to wireless charge the electronic device via the first wireless charging module 352.

Figure 3B:
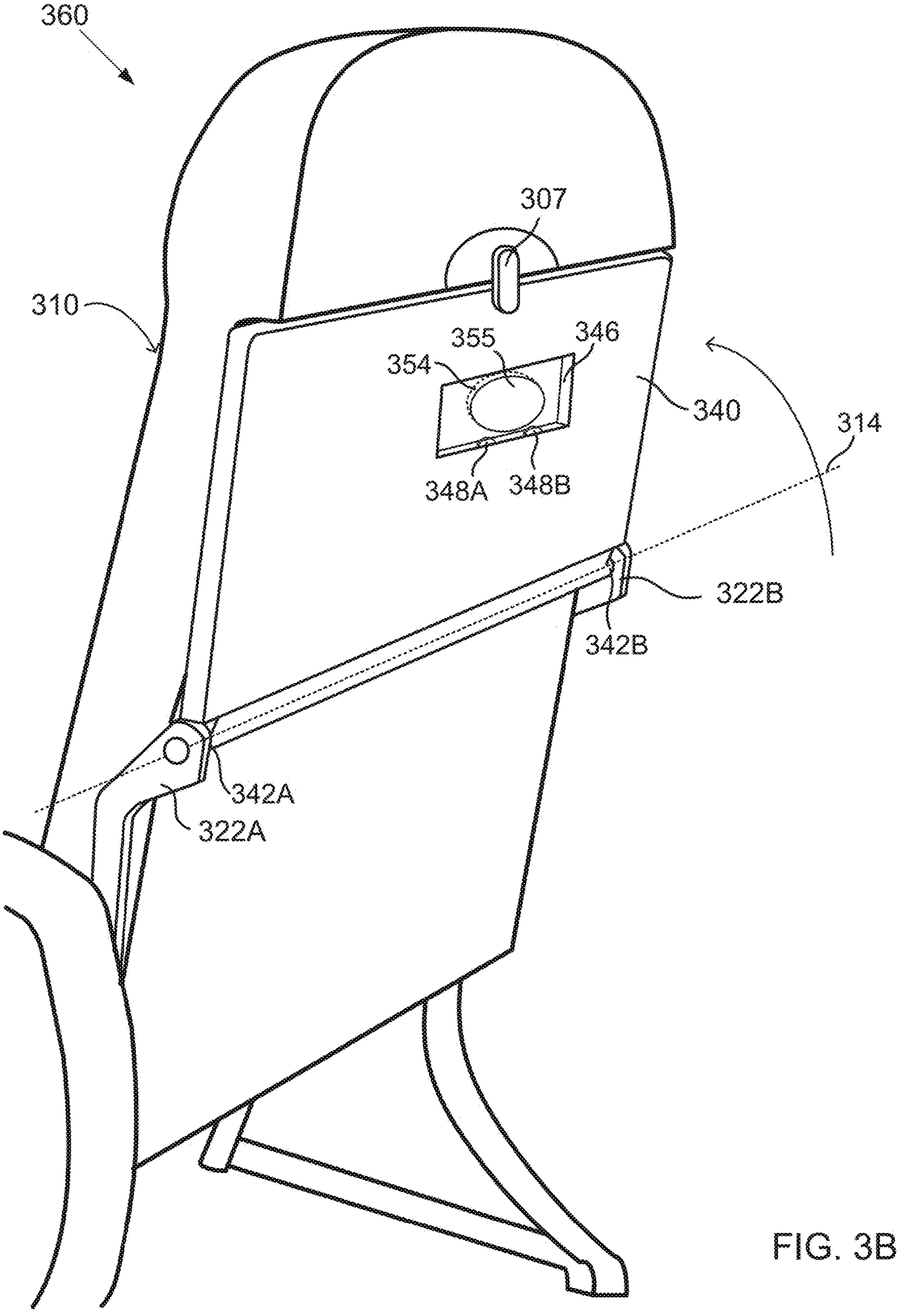
FIG. 3B is an example diagram illustrating the tray assembly of FIG. 3A installed with the passenger seat, where the tray table is in the stow position, according to some aspects of the disclosure.

FIG. 3B is an example diagram 360 illustrating the tray assembly 310*a* installed with the passenger seat 305, where the tray table 340 is in the stow position, according to some aspects of the disclosure. The first support arm 322A, the second support arm 322B, and the tray table 340 with the first connecting portion 342A and the second connecting portion 342B are described in detail above with reference to FIG. 3A, and thus explanations of these parts in FIG. 3B are omitted. As shown in FIG. 3B, the tray table 340 is in the stow position where the tray table 340 is substantially parallel and anchored to a seatback of the passenger seat 305 (e.g., via the locking mechanism 307). As discussed above, the tray table 340 is pivotably coupled to the first support arm 322A and the second support arm 322B to pivotably move (e.g., by rotating about the rotation axis 314) between the stow position shown in FIG. 3B and the open position in FIG. 3A.

For example, as shown in FIG. 3B, the tray table 340 may include a second wireless charging module 354 embedded within the tray table 340 and configured to charge an electronic device wirelessly when the electronic device is within a threshold distance from the second wireless charging module 354. In particular, the electronic device may be placed on or near a second charging area 355 on a bottom surface of the tray table 340, where a location of the second charging area 355 corresponds to a location of the second wireless charging module 354. By contacting or nearly contacting the second charging area 355, the electronic device may be within the threshold distance from the second wireless charging module 354 to wireless charge the electronic device via the second wireless charging module 354.

In some aspects, the tray assembly 310*a* may include both the first wireless charging module 352 and the second wireless charging module 354. In another aspect, the tray assembly 310*a* may include either the first wireless charging module 352 or the second wireless charging module 354.

In an aspect, the tray assembly further comprises a device holding structure configured to hold the electronic device close to the second charging area to wirelessly charge the electronic device. For example, as shown in FIG. 3B, a device holding structure 346 with device holders 348A and 348B may be implemented to hold the electronic device close to the second charging area 355 within the threshold distance to wireless charge the electronic device. In particular, in the example of FIG. 3B, the device holding structure 346 may be a holding recess to receive the electronic device, and the electronic device may be held within the holding recess by the device holders 348A and 348B such that the electronic device may be within the threshold distance from the second wireless charging module 354. With the device holding structure holding the electronic device, a passenger may wireless charge the electronic device using the second wireless charging module 354 and view the electronic device at the same time.

As discussed above. in some aspects, the first support arm 322A and/or the second support arm 322B may include power line(s) carrying electricity to supply electricity. For example, a power line may run through the first support arm 322A or the second support arm 322B and may be connected to the first wireless charging module 352 and/or the second wireless charging module 354 in the tray table 340 to supply electricity.

According to some aspects, various optional features may be implemented, in addition to the features shown in FIG. 3A and FIG. 3B. For example, one or more of the optional features discussed below may be additionally implemented.

Figure 3C:
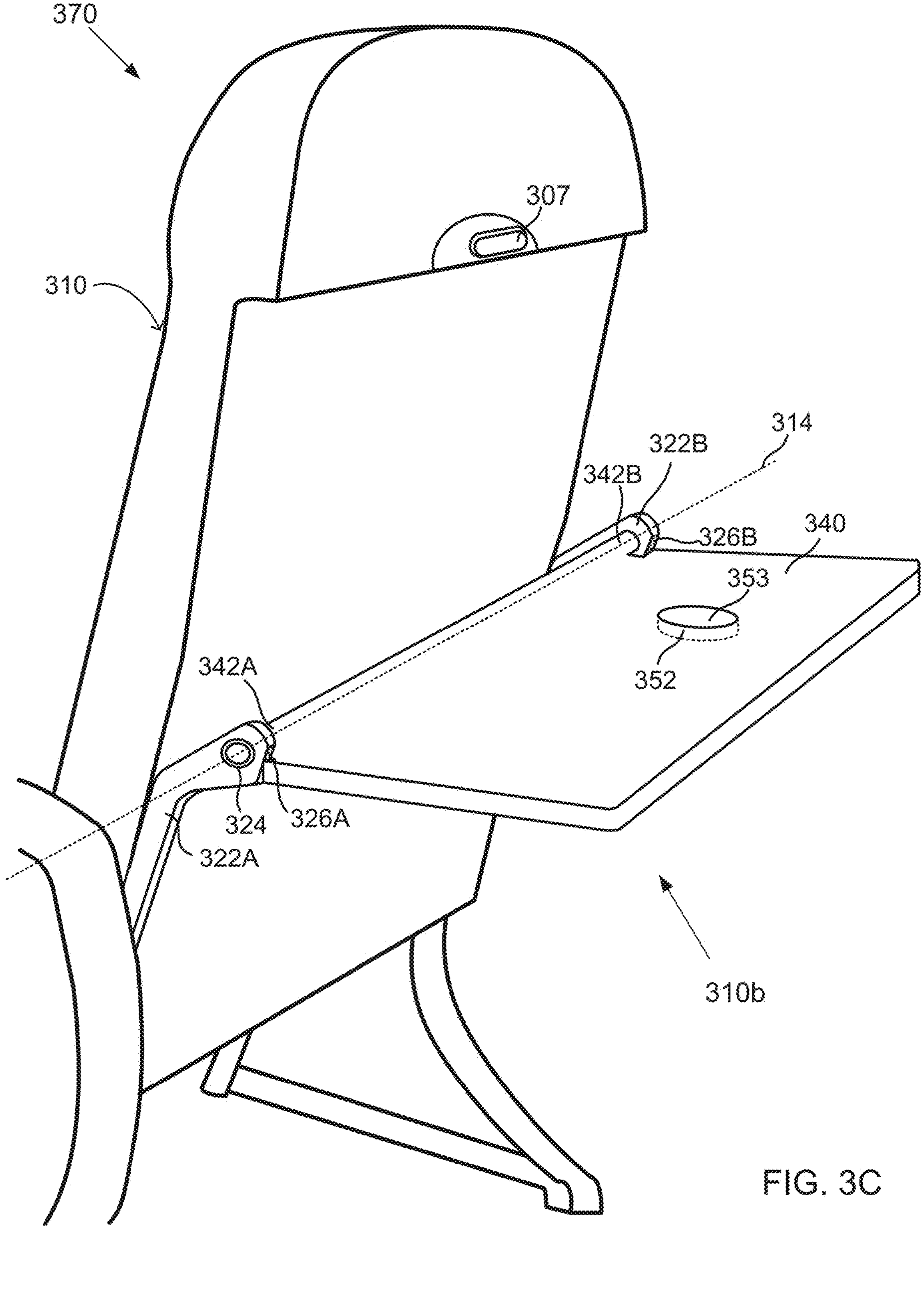
FIG. 3C is an example diagram illustrating a tray assembly installed with the passenger seat of the transportation vehicle, according to some aspects of the disclosure.

FIG. 3C is an example diagram 370 illustrating a tray assembly 310*b* installed with the passenger seat 305 of the transportation vehicle, according to some aspects of the disclosure. The tray assembly 310*b* of FIG. 3C includes the first support arm 322A, the second support arm 322B, the tray table 340 with the first connecting portion 342A and the second connecting portion 342B, may include the first wireless charging module 352 with the first charging area 353, and may further includes optional feature(s) as discussed below. The first support arm 322A, the second support arm 322B, the tray table 340 with the first connecting portion 342A and the second connecting portion 342B, and the first wireless charging module 352 with the first charging area 353 are described in detail above with reference to FIG. 3A, and thus explanations of these parts in FIG. 3C are omitted.

As shown in FIG. 3C, the tray assembly 310*b* may optionally include a position detector component 324 configured to detect whether the tray table 340 is in the stow position or in the open position. In an example, the position detector component 324 may be a device that activates or deactivate a switch depending on which position the tray table 340 is in. The example of FIG. 3C shows the position detector component 324 implemented in the first support arm 322A. However, in another example, the position detector component 324 may be implemented in a different portion of the tray assembly 310*b*.

Further, as shown in FIG. 3C, the tray assembly 310*b* may optionally include lighting devices 326A and 326B configured to illuminate a surrounding area of the tray assembly 310*b* when activated.

Figure 3D:
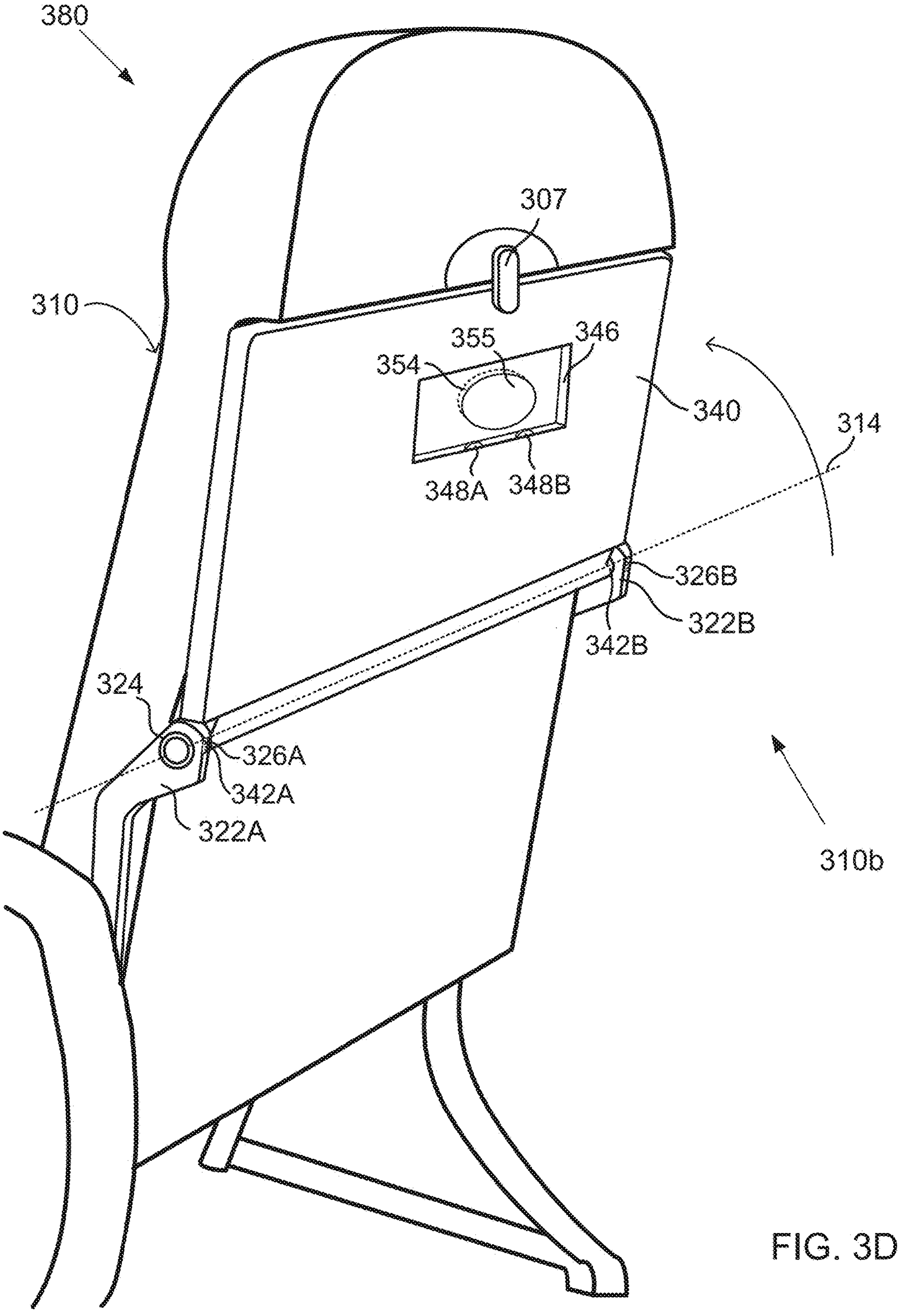
FIG. 3D is an example diagram illustrating the tray assembly of FIG. 3C installed with the passenger seat of a transportation vehicle, where the tray table is in the stow position, according to some aspects of the disclosure.

FIG. 3D is an example diagram 380 illustrating the tray assembly 310*b* installed with the passenger seat 305 of a transportation vehicle, where the tray table 340 is in the stow position, according to some aspects of the disclosure. The first support arm 322A, the second support arm 322B, the position detector component 324, the lighting devices 326A and 326B, the tray table 340 with the first connecting portion 342A and the second connecting portion 342B, the second wireless charging module 354 with the second charging area 355, and the device holding structure 346 with the device holders 348A and 348B are described in detail above with reference to FIG. 3A, FIG. 3B, and FIG. 3C, and thus explanations of these parts in FIG. 3D are omitted. As shown in FIG. 3D, the tray table 340 is in the stow position where the tray table 340 is substantially parallel and anchored to a seatback of the passenger seat 305 (e.g., via the locking mechanism 307). As discussed above, the tray table 340 is pivotably coupled to the first support arm and the second support arm to pivotably move (e.g., by rotating about the rotation axis 314) between the stow position shown in FIG. 3D and the open position in FIG. 3C.

In an example, as shown in FIG. 3C and FIG. 3D, the tray assembly 310*b* may optionally include lighting devices 326A and 326B, where the lighting devices 326A and 326B may illuminate the surrounding area of the tray assembly 310*b* (e.g., around the tray 340) when activated. In an example, the position detector component 324 activates the lighting devices 326A and 326B when the position detector component 324 senses that the tray table 340 is in the open position, while the position detector component 324 deactivates the lighting devices 326A and 326B to turn them off when the position detector component 324 senses that the tray table 340 is in the stow position. In the example shown in FIG. 3D, the tray table 340 is in the stow position, and thus the lighting devices 326A and 326B are deactivated and turned off. On the other hand, in the example shown in FIG. 3C, the tray table 340 is in the open position, and thus the lighting devices 326A and 326B are activated and thus illuminates the surrounding area. In the example shown in FIG. 3C and FIG. 3D, the lighting devices 326A and 326B are implemented with the first support arm 322A and the second support arm 322B, respectively. However, in another example, the lighting devices may be implemented in a different part of the tray assembly 310*b*, such as the tray table 340.

According to another aspect of the disclosure, the tray assembly includes the tray table and a power supply bar including at least one first-surface electrical outlet at a first surface of the power supply bar and at least one second-surface electrical outlet at a second surface of the power supply bar different from the first surface, where the power supply bar is attached to the tray table to move with the tray table. The power supply bar is positioned to have the at least one first-surface electrical outlet face substantially upward with respect to the floor and away from the passenger seat when the tray table is in the open position, while the power supply bar is positioned to have the at least one second-surface electrical outlet face substantially upward with respect to the floor and away from the passenger seat when the tray table is in the stow position.

Figure 4A:
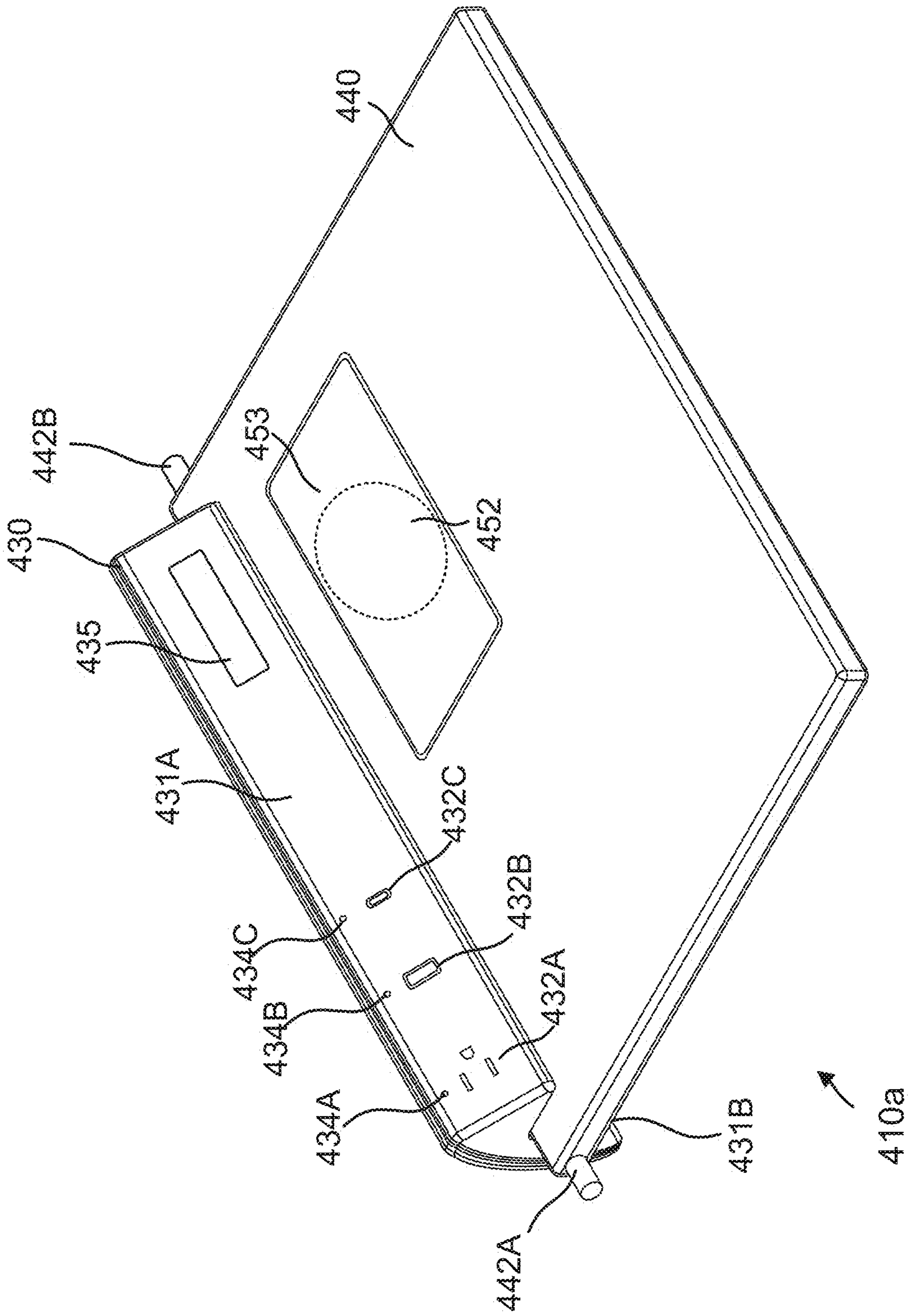
FIG. 4A is an example diagram illustrating a perspective view of a tray assembly, according to some aspects of the disclosure.
Figure 4B:
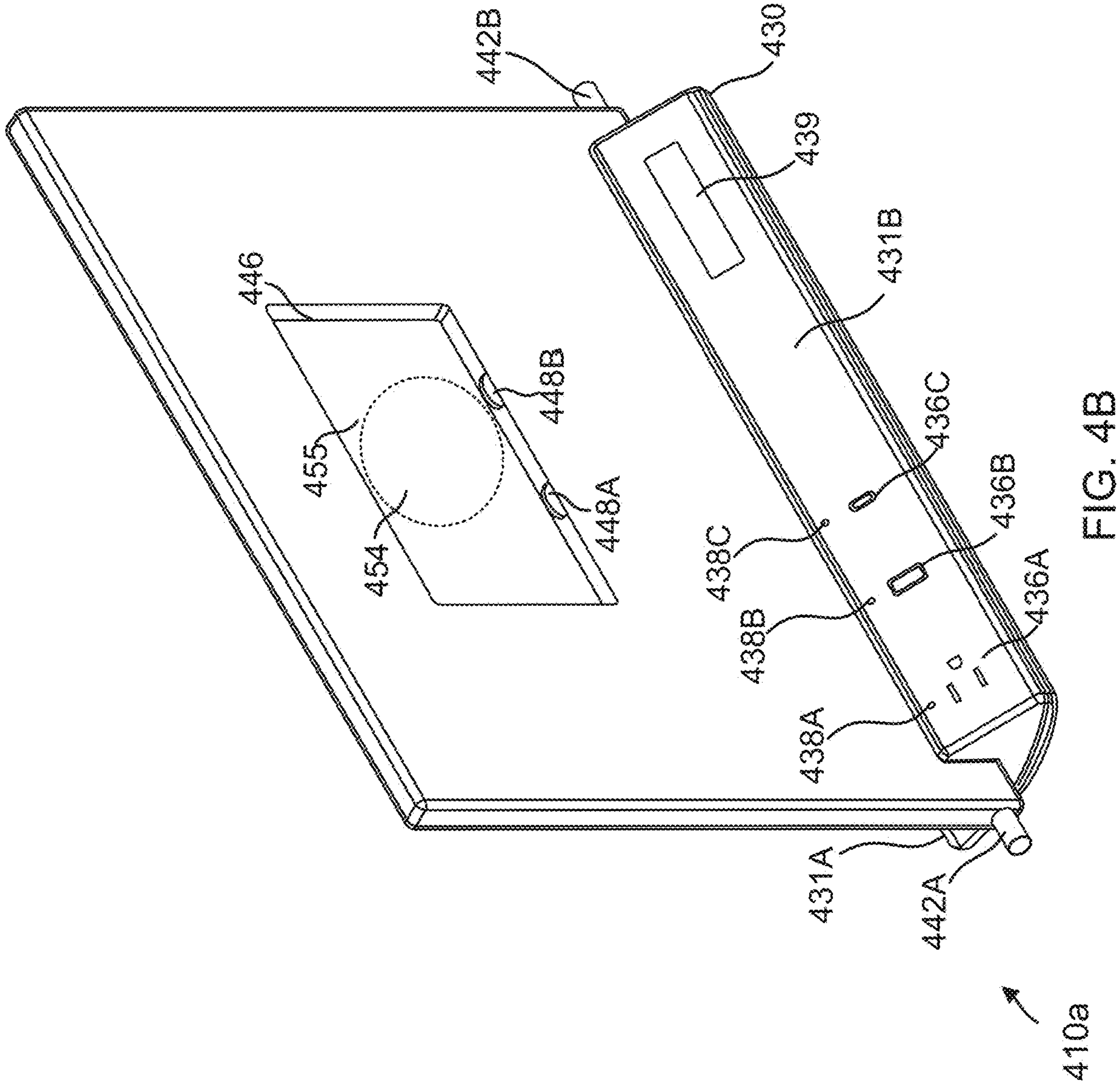
FIG. 4B is an example diagram illustrating a perspective view of the tray assembly of FIG. 4A at a different angle, according to some aspects of the disclosure.

FIG. 4A is an example diagram illustrating a perspective view of a tray assembly, according to some aspects of the disclosure. FIG. 4B is an example diagram illustrating a perspective view of the tray assembly of FIG. 4A at a different angle, according to some aspects of the disclosure. In the example shown in FIGS. 4A and 4B, a tray assembly 410*a* includes a tray table 440 and a power supply bar 430.

In the example shown in FIGS. 4A and 4B, a first connecting portion 442A of the tray table 440 may be rotatably coupled to a first support arm of a passenger seat at a left side, while a second connecting portion 442B of the tray table 440 may be rotatably coupled to a second support arm at a right side. As such, the tray table 440 is configured to be pivotably coupled to the first and support arms to pivotably move between a stow position where the tray table 440 is substantially parallel and anchored to a seatback of the passenger seat and an open position where the tray table 440 is substantially parallel to a floor of the transportation vehicle and released away from the seatback. In FIG. 4A, the perspective view shows a view of the tray table 440 in the open position, with the tray table 440 being substantially parallel to the floor. In FIG. 4B, the perspective view shows a view of the tray table 440 in the stow position, with the tray table 440 being substantially parallel and anchored to a seatback of the passenger seat.

The power supply bar 430 is attached to the tray table 440, such that the power supply bar 430 moves with the tray table 440 when the tray table 440 rotates. Hence, when the tray table 440 is rotated to the open position, the power supply bar 430 may be rotated along with the tray table 440 to show a first-surface 431A of the power supply bar 430, as shown in FIG. 4A. On the other hand, when the tray table 440 is rotated to the stow position, the power supply bar 430 may be rotated along with the tray table 440 to show a second-surface 431B of the power supply bar 430, as shown in FIG. 4B. When the tray table 440 is at the open position, electrical outlets at the first-surface 431A are easily accessible to a passenger. On the other hand, when the tray table 440 is at the stow position, electrical outlets at the second-surface 431B are easily accessible to a passenger.

As shown in FIG. 4A, the power supply bar 430 includes at least one first-surface electrical outlet at a first-surface 431A of the power supply bar 430, such as a first electrical outlet 432A, a second electrical outlet 432B, and a third electrical outlet 432C at the first-surface 431A. The first electrical outlet 432A, the second electrical outlet 432B, and the third electrical outlet 432C may be collectively referred to as the first-surface electrical outlets 432A, 432B, and 432C. For example, the first electrical outlet 432A is an AC power socket, the second electrical outlet 432B is a USB Type-A charging outlet, and the third electrical outlet 432C is a USB Type-C charging outlet. In some aspects, at least one of the first electrical outlet 432A, the second electrical outlet 432B, and the third electrical outlet 432C may include a ground fault circuit interrupter (GFCI). Although the example in FIG. 4A shows that the power supply bar 430 includes the first electrical outlet 432A, the second electrical outlet 432B, and the third electrical outlet 432C, less than all of the first electrical outlet 432A, the second electrical outlet 432B, and the third electrical outlet 432C may be included at the first-surface 431A of the power supply bar 430 the power supply bar 431 in another embodiment not shown in FIG. 4A. In some aspects, at least one of the first electrical outlet 432A, the second electrical outlet 432B, and the third electrical outlet 432C may include a lighting device that is configured to illuminate when in use and is configured to turn off when not in use.

In some aspects, the tray assembly 410*a* may optionally include a first indicator light 434A indicating whether electricity to the first electrical outlet 432A being the AC outlet is activated or deactivated. Further, the tray assembly 410*a* may optionally include a second indicator light 434B indicating whether electricity to the second electrical outlet 432B is activated or deactivated and a third indicator light 434C indicating whether electricity to the third electrical outlet 432C is activated or deactivated. The first indicator light 434A, the second indicator light 434B, and the third indicator light 434C may be collectively referred to as first-surface indicator lights 434A, 434B, and 434C.

As shown in FIG. 4B, the power supply bar 430 includes at least one second-surface electrical outlet at a second-surface 431B of the power supply bar 430, such as a fourth electrical outlet 436A, a fifth electrical outlet 436B, and a sixth electrical outlet 436C at the second-surface 431B. The fourth electrical outlet 436A, the fifth electrical outlet 436B, and the sixth electrical outlet 436C may be collectively referred to as the second-surface electrical outlets 436A, 436B, and 436C. For example, the fourth electrical outlet 436A is an AC power socket, the fifth electrical outlet 436B is a USB Type-A charging outlet, and the sixth electrical outlet 436C is a USB Type-C charging outlet. In some aspects, at least one of the fourth electrical outlet 436A, the fifth electrical outlet 436B, and the sixth electrical outlet 436C may include a ground fault circuit interrupter (GFCI). Although the example in FIG. 4A shows that the power supply bar 430 includes the fourth electrical outlet 436A, the fifth electrical outlet 436B, and the sixth electrical outlet 436C, less than all of the fourth electrical outlet 436A, the fifth electrical outlet 436B, and the sixth electrical outlet 436C may be included at the second-surface 431B of the power supply bar 430 the power supply bar 431 in another embodiment not shown in FIG. 4B. In some aspects, at least one of the fourth electrical outlet 436A, the fifth electrical outlet 436B, and the sixth electrical outlet 436C may include a lighting device that is configured to illuminate when in use and is configured to turn off when not in use.

In some aspects, the tray assembly 410*a* may optionally include a first indicator light 438A indicating whether electricity to the first electrical outlet 432A being the AC outlet is activated or deactivated. Further, the tray assembly 410*a* may optionally include a second indicator light 438B indicating whether electricity to the second electrical outlet 432B is activated or deactivated and a third indicator light 438C indicating whether electricity to the sixth electrical outlet 436C is activated or deactivated. The first indicator light 438A, the second indicator light 438B, and the third indicator light 434C may be collectively referred to as second-surface indicator lights 438A, 438B, and 438C.

In some aspects, the tray table may optionally include at least one wireless charging module embedded within the tray table. Here, the at least one wireless charging module is configured to charge an electronic device wirelessly when the electronic device is within a threshold distance from the at least one wireless charging module.

In some aspects, the at least one wireless charging module may include a first wireless charging module configured to wirelessly charge the electronic device when the electronic device is within the threshold distance from the first wireless charging module by contacting a first charging area on a top surface of the tray table, the top surface being a surface on a top side of the tray table with respect to the floor when the tray table is in the open position, where a location of the first charging area corresponds to a location of the first wireless charging module embedded within the tray table. For example, as shown in FIG. 4A, the tray table 440 may include a first wireless charging module 452 embedded within the tray table 440 and configured to charge an electronic device wirelessly when the electronic device is within a threshold distance from the first wireless charging module 452. In particular, the electronic device may be placed on a first charging area 453 on a top surface of the tray table 440 to contact the first charging area 453, where a location of the first charging area 453 corresponds to a location of the first wireless charging module 452. By contacting the first charging area 453, the electronic device may be within the threshold distance from the first wireless charging module 452 to wireless charge the electronic device via the first wireless charging module 452.

In some aspects, the at least one wireless charging module may include a second wireless charging module configured to wirelessly charge the electronic device when the electronic device is within the threshold distance from the second wireless charging module by contacting a second charging area on a bottom surface of the tray table, the bottom surface being a surface on a bottom side of the tray table facing the floor when the tray table is in the open position. In an aspect, a location of the second charging area corresponds to a location of the second wireless charging module. For example, as shown in FIG. 4B, the tray table 440 may include a second wireless charging module 454 embedded within the tray table 440 and configured to charge an electronic device wirelessly when the electronic device is within a threshold distance from the second wireless charging module 454. In particular, the electronic device may be placed on or near a second charging area 455 on a bottom surface of the tray table 440, where a location of the second charging area 455 corresponds to a location of the second wireless charging module 454. By contacting or nearly contacting the second charging area 455, the electronic device may be within the threshold distance from the second wireless charging module 454 to wireless charge the electronic device via the second wireless charging module 454.

In some aspects, the tray assembly 410*a* may include both the first wireless charging module 452 and the second wireless charging module 454. In another aspect, the tray assembly 410*a* may include either the first wireless charging module 452 or the second wireless charging module 454.

In an aspect, the tray assembly may further include a device holding structure configured to hold the electronic device close to the second charging area to wirelessly charge the electronic device. For example, as shown in FIG. 4B, a device holding structure 446 with device holders 448A and 448B may be implemented to hold the electronic device close to the second charging area 455 within the threshold distance to wireless charge the electronic device. In particular, in the example of FIG. 4B, the device holding structure 446 may be a holding recess to receive the electronic device, and the electronic device may be held within the holding recess by the device holders 448A and 448B such that the electronic device may be within the threshold distance from the second wireless charging module 454. With the device holding structure holding the electronic device, a passenger may wireless charge the electronic device using the second wireless charging module 454 and view the electronic device at the same time.

In some aspects, as shown in FIG. 4A, the tray assembly 410*a* may optionally include a first display device 435 with a display screen at the first-surface 431A of the power supply bar 430. The display screen of the first display device 435 may display various types of information, such as information on statuses of the first electrical outlet 432A, the second electrical outlet 432B, and the third electrical outlet 432C and/or a status of the first wireless charging module 452. For example, the display screen of the first display device 435 may display a text and/or an image indicating "AC socket in use" or "USB port in use" or "wireless charging in use".

Similarly, in some aspects, as shown in FIG. 4B, the tray assembly 410*a* may optionally include a second display device 439 with a display screen at the second-surface 431B of the power supply bar 430. The display screen of the second display device 439 may display various types of information, such as information on statuses of the fourth electrical outlet 436A, the fifth electrical outlet 436B, and the sixth electrical outlet 436C and/or a status of the second wireless charging module 454. For example, the display screen of the second display device 439 may display a text and/or an image indicating "AC socket in use" or "USB port in use" or "wireless charging in use".

In some aspects, each of the first-surface electrical outlets 432A, 432B, and 432C and the second-surface electrical outlets 436A, 436B, and 436C may have a sealing mechanism, where opening(s) of the first-surface electrical outlets 432A, 432B, and 432C and the second-surface electrical outlets 436A, 436B, and 436C are closed when not in use (e.g., not plugged in). As such, the first-surface electrical outlets 432A, 432B, and 432C and the second-surface electrical outlets 436A, 436B, and 436C may be spill-proof to prevent foreign substances (e.g., liquid) from entering the first-surface electrical outlets 432A, 432B, and 432C and the second-surface electrical outlets 436A, 436B, and 436C via their openings.

In some aspects, the at least one electrical outlet may be located at a higher position with respect to the floor than a top surface of the tray table when the tray table is in the open position. For example, as shown in FIG. 4A, the first electrical outlet 432A, the second electrical outlet 432B, and the third electrical outlet 432C are located at a higher position than a top surface of the tray table 440 with respect to the floor when the tray table 440 is in the open position. As such, even if a passenger spills a drink or liquid on the tray table 440, it will be difficult for such spilled liquid to reach the first electrical outlet 432A, the second electrical outlet 432B, and the third electrical outlet 432C, thereby providing safety benefits by minimizing the spilled liquid entering the first electrical outlet 432A, the second electrical outlet 432B, and the third electrical outlet 432C.

Figure 4C:
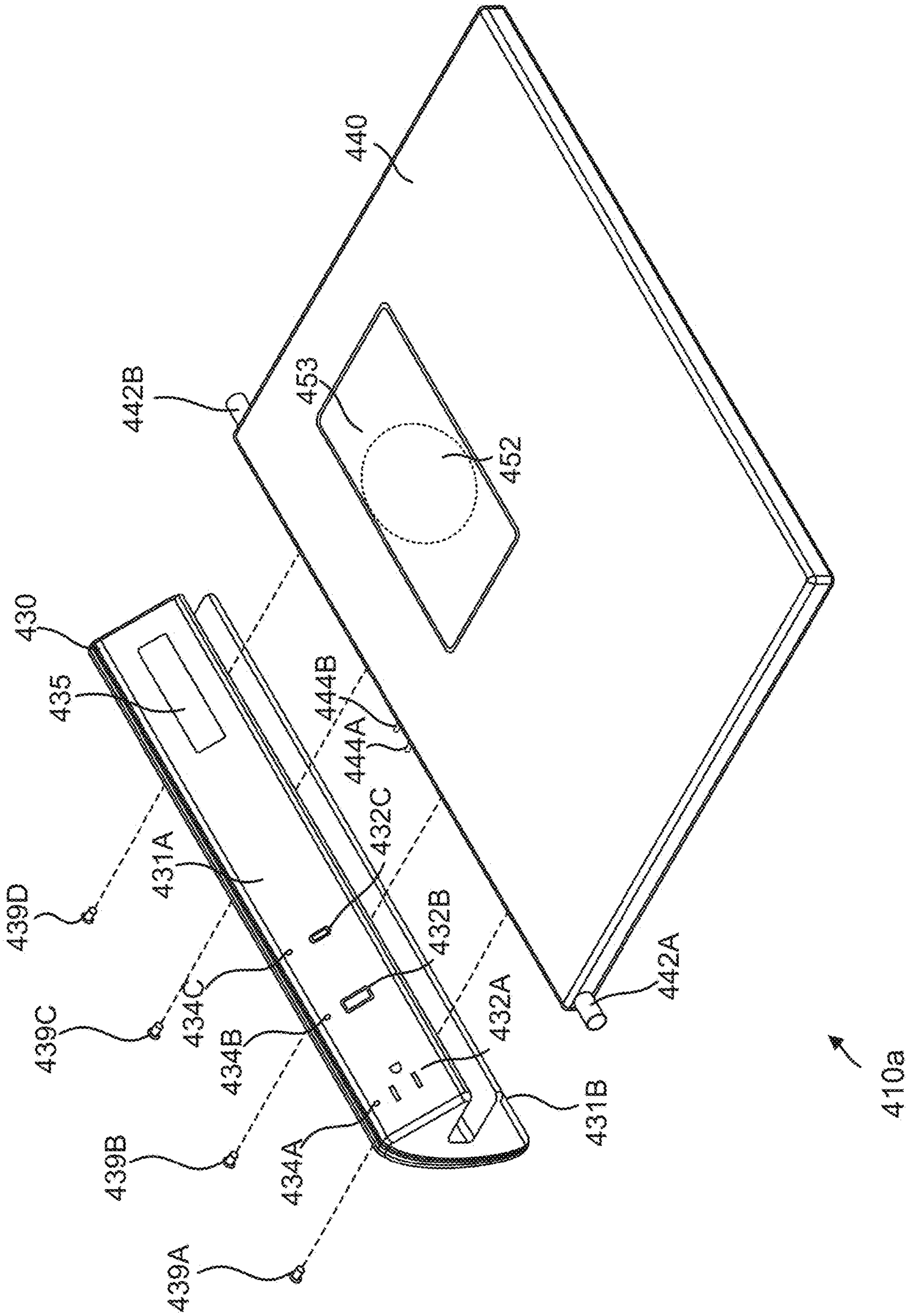
FIG. 4C is an example diagram illustrating a perspective view of the tray assembly of FIG. 4A partially disassembled, according to some aspects of the disclosure.

FIG. 4C is an example diagram illustrating a perspective view of the tray assembly of FIG. 4A partially disassembled (exploded view), according to some aspects of the disclosure. In some aspects, the power supply bar 430 may be a modular structure that can be attached to and detached from the tray table 440. In the example shown in FIG. 4C, the power supply bar 430 may be attached to the tray table 440 via screws 439A, 439B, 439C, and 439D. The power supply bar 430 may be removed from the tray table 440 by removing the screws 439A, 439B, 439C, and 439D. As such, the power supply bar 430 may be easily swapped with another power supply bar, (e.g., to upgrade to a new updated power supply bar).

In some aspects, the electricity may be delivered via an electrical connection at the first connecting portion 442A and this electricity may be delivered to the power supply bar 430 via electronical connections between the tray table 440 and the power supply bar 430. The electrical connection between the tray table 440 and the power supply bar 430 may be implemented in a modular design such that the power supply bar can be easily assembled with the tray table 440 or removed from the tray table 440 (e.g., for repairs). In the example shown in FIG. 4C, the tray table 440 includes electrical connectors 444A and 444B, where the electrical connectors 444A and 444B are male connectors configured to be electrically connected to corresponding female connectors (not shown in FIG. 4C) at the power supply bar 430, to provide an electrical connection to provide the electricity to the first-surface electrical outlets 432A, 432B, and 432C and the second-surface electrical outlets 436A, 436B, and 436C as well as the first-surface indicator lights 434A, 434B, and 434C and the second-surface indicator lights 438A, 438B, and 438C. For example, the electrical connectors 444A and 444B may be inserted in to the corresponding female connectors of the power supply bar 430 to establish the electrical connection. In another embodiment not shown in FIG. 4C, male electrical connectors may be implemented at the power supply bar 430 and corresponding female electrical connectors may be implemented at the tray table 440.

In an example, the electricity provided to the power supply bar 430 (e.g., via the electrical connectors 444A and 444B) may be a 115 volt AC, 50/60 Hz (e.g., with pins 115 volts AC Hi, 115 volts AC low, Chassis Ground), or 28 volts DC (e.g., with pins +28 volts, 28 volts Return, Chassis Ground), or plus 2 Discrete inputs (e.g., Power Bar Present, Restricted Mode On), or any combinations of these.

Figure 4D:
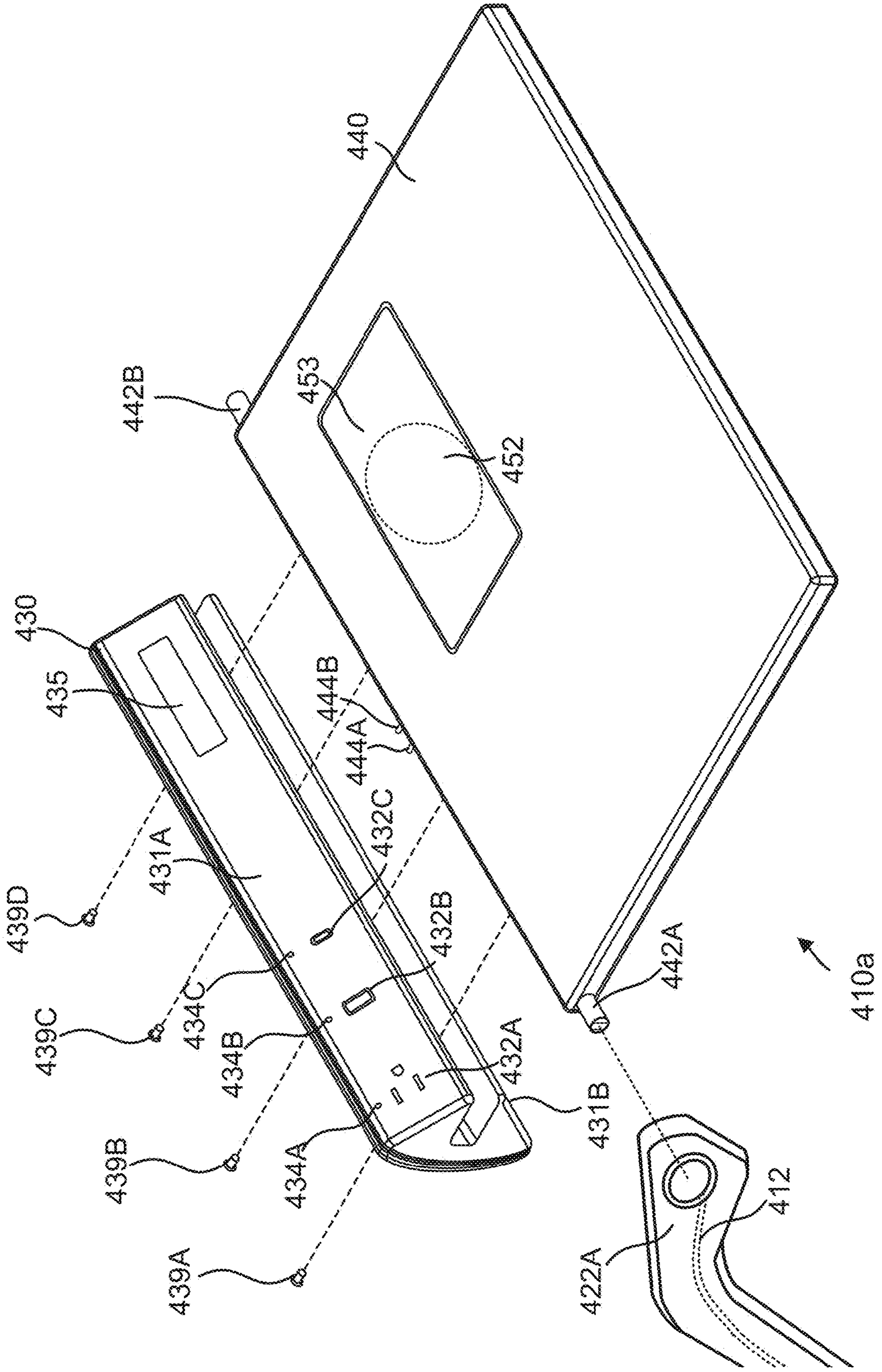
FIG. 4D is an example diagram illustrating a perspective view of the tray assembly of FIG. 4A partially disassembled and showing an electrical connection between a tray table and a support arm, according to some aspects of the disclosure.

FIG. 4D is an example diagram illustrating a perspective view of the tray assembly of FIG. 4A partially disassembled and showing an electrical connection between a tray table and a support arm, according to some aspects of the disclosure. In some aspects, the first support arm and/or the second support arm of the passenger seat may include power line(s) carrying electricity to supply electricity. For example, as shown in FIG. 4D, a power line 412 (e.g., electrical wire(s)) may carry electricity for the first-surface electrical outlets 432A, 432B, and 432C and the second-surface electrical outlets 436A, 436B, and 436C as well as the first-surface indicator lights 434A, 434B, and 434C and the second-surface indicator lights 438A, 438B, and 438C. The power line 412 may be used to power any electrical parts in the tray assembly 410*a*. For example, the power line 412 may run through the floor to a main power supply that supplies electricity. The second support arm is not shown in FIG. 4D for simplicity.

In the example shown in FIG. 4D, the power line 412 at the first support arm 422 provides electricity to an electrical connector at the first support arm 422. When the first connecting portion 442A is rotatably coupled to the first support arm 422A, the first support arm 422A is also electrically connected to the electrical connector of the first support arm 422A, such that the electricity from the power line 412 may be provided to the electrical connectors 444A and 444B via the first connecting portion 442A. For example, when the first connecting portion 442A is rotatably coupled to the first support arm 422A, the first connecting portion 442A may be inserted into a recess with the electrical connector at the first support arm 422A, to establish the electrical connection.

Figure 4E:
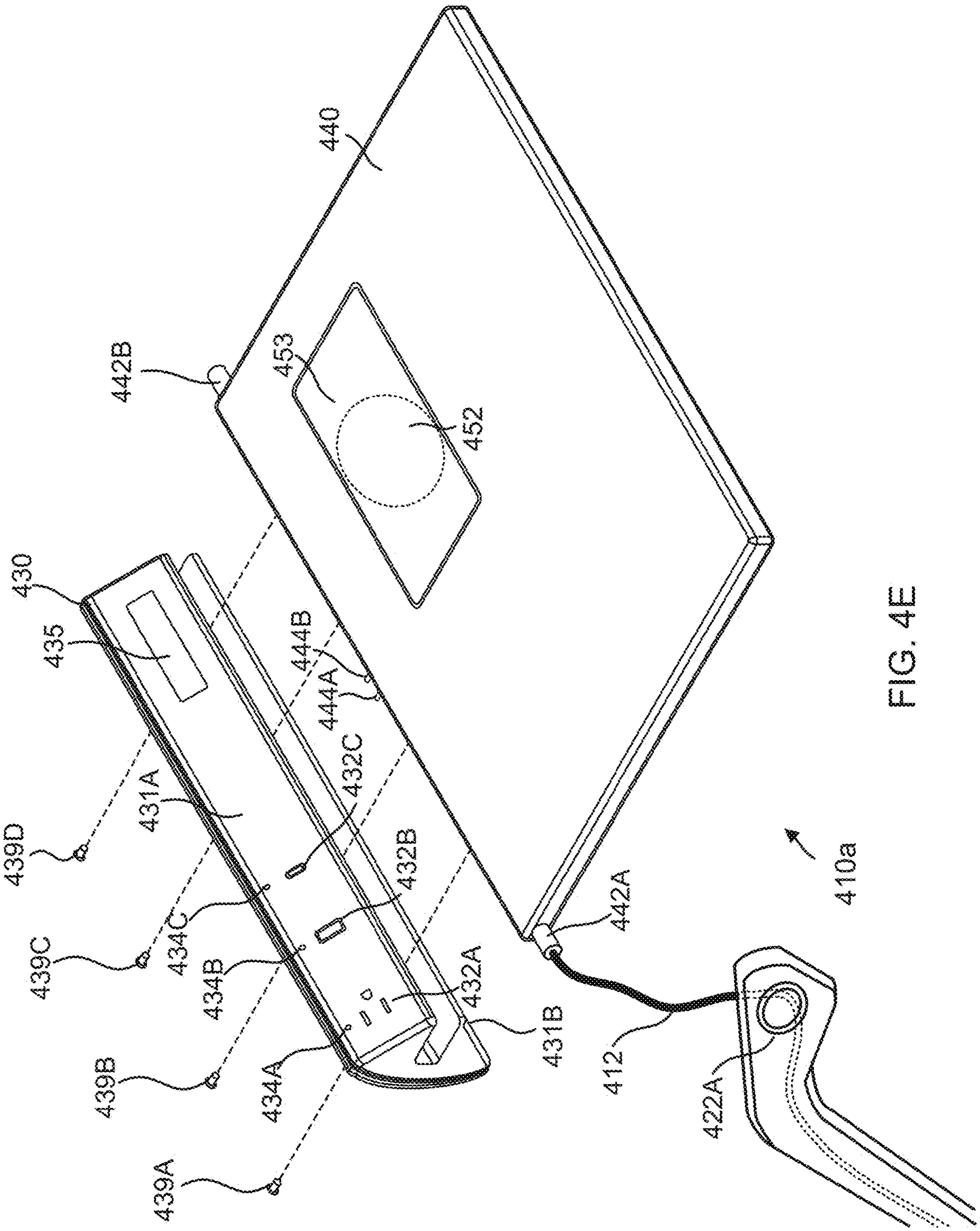
FIG. 4E is an example diagram illustrating a perspective view of the tray assembly of FIG. 4A partially disassembled and showing a power line, according to some aspects of the disclosure.

FIG. 4E is an example diagram illustrating a perspective view of the tray assembly of FIG. 4A partially disassembled and showing a power line, according to some aspects of the disclosure. In some aspects, the first support arm and/or the second support arm of the passenger seat may include power line(s) carrying electricity to supply electricity. For example, as shown in FIG. 4E, a power line 412 (e.g., electrical wire(s)) may carry electricity for the first-surface electrical outlets 432A, 432B, and 432C and the second-surface electrical outlets 436A, 436B, and 436C as well as the first-surface indicator lights 434A, 434B, and 434C and the second-surface indicator lights 438A, 438B, and 438C. In some aspects, the power line 412 may run through the first connecting portion 442A, such that the electricity from the power line 412 may be provided to the electrical connectors 444A and 444B to provide the electricity to the power supply bar 430. The power line 412 may be used to power any electrical parts in the tray assembly 410*a*. For example, the power line 412 may run through the floor to a main power supply that supplies electricity. The second support arm is not shown in FIG. 4E for simplicity.

Figure 4F:
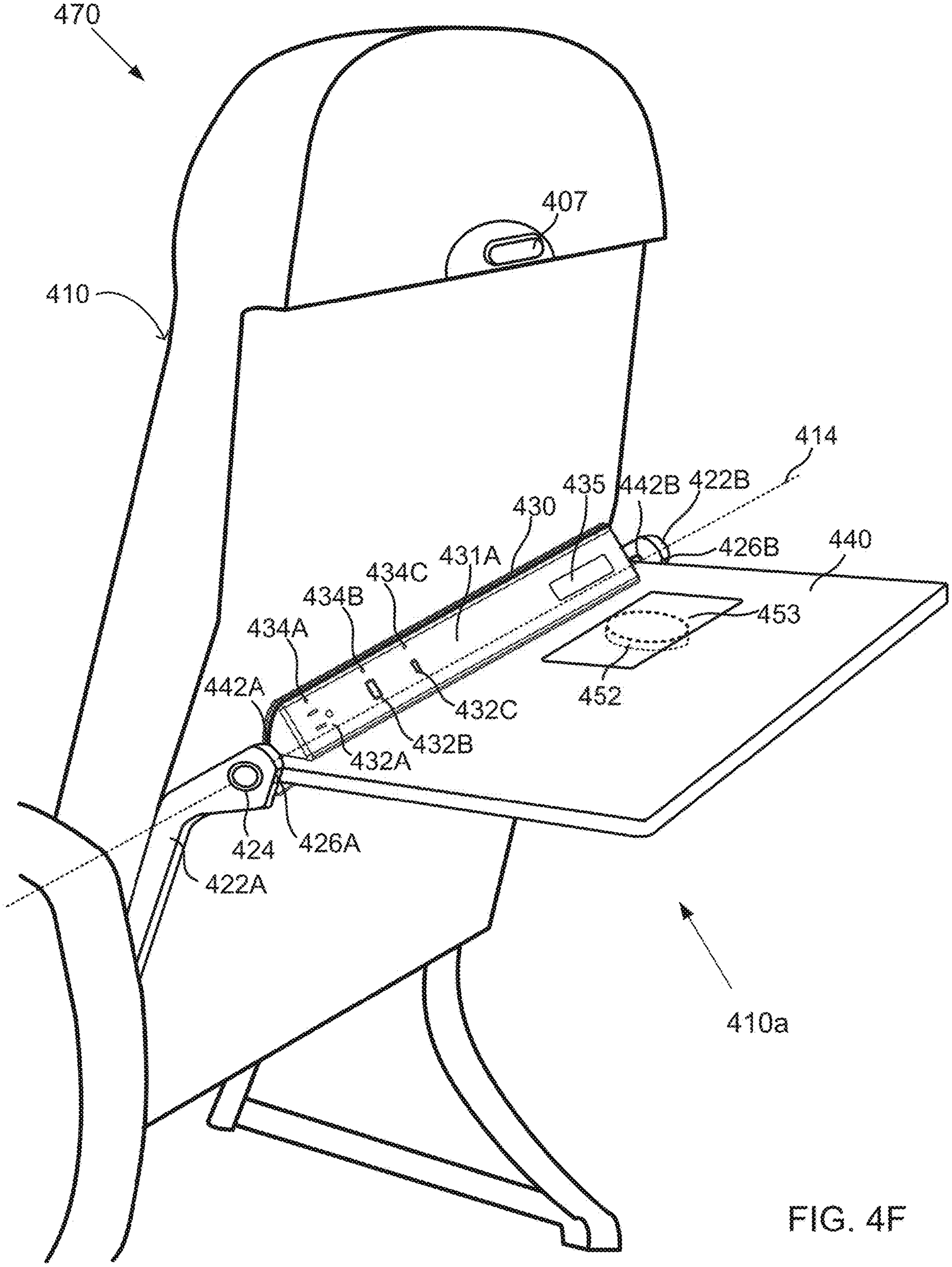
FIG. 4F is an example diagram illustrating the tray assembly of FIG. 4A installed with a passenger seat, where the tray table is in an open position, according to some aspects of the disclosure.

FIG. 4F is an example diagram illustrating the tray assembly of FIG. 4A installed with a passenger seat, where the tray table is in an open position, according to some aspects of the disclosure. As shown in FIG. 4F, the tray assembly 410*a* includes at least the tray table 440 and the power supply bar 430. The explanations of the various components and features of the tray table 440 and the power supply bar 430 are provided above and thus are omitted. The tray assembly 410*a* may further include a first support arm 422A and a second support arm 422B. The first support arm 422A may be coupled to a left side of the passenger seat 405. The second support arm 422B may be coupled to a right side of the passenger seat 405 and is spaced apart from the first support arm 422A. In some aspects, the first support arm 422A and the second support arm 422B may be pivotably coupled to the left side and the right side of the passenger seat 405, respectively.

In the example of FIG. 4F, the tray table 440 is pivotably coupled to the first support arm 422A at a left corner of the tray table 440 and is further pivotably coupled to the second support arm 422B at a right corner of the tray table 440. Hence, the tray table 440 can be rotated with respect to a rotation axis 414 while being pivotably coupled to the first support arm 422A and the second support arm 422B. In the example shown in FIG. 4A, a first connecting portion 442A of the tray table 440 is rotatably coupled to the first support arm 422A, while a second connecting portion 442B of the tray table 440 is rotatably coupled to the second support arm 422B.

The tray table 440 is pivotably coupled to the first support arm 422A and the second support arm 422B to pivotably move (e.g., by rotating about the rotation axis 414) between a stow position where the tray table 440 is substantially parallel and anchored to a seatback of the passenger seat 405 and an open position where the tray table 440 is substantially parallel to a floor of the transportation vehicle and released away from the seatback. In the example shown in FIG. 4F, the tray table 440 is in the open position, with the tray table 440 is substantially parallel to the floor, such that a passenger may place an item or food on top of the tray table 440. Further, in an example, the first support arm 422A may be pivotably coupled to the left side of the passenger seat 405, while the second support arm 422B may be pivotably coupled to the right side of the passenger seat 405. The passenger seat 405 may include a locking mechanism 407 to hold the tray table 440 in the stow position.

In some aspects, the tray assembly may further include a position detector component configured to detect whether the tray table is in the stow position or in the open position. For example, as shown in FIG. 4F, the tray assembly 410*a* may optionally include a position detector component 424 configured to detect whether the tray table 440 is in the stow position or in the open position. In an example, the position detector component 424 may be a device that activates or deactivate a switch depending on which position the tray table 440 is in. The example of FIG. 4F shows the position detector component 424 implemented in the first support arm 422A. However, in another example not shown in FIG. 4F, the position detector component 424 may be implemented in a different portion of the tray assembly 410*a*. In an example, the position detector component may be a mechanical device having parts that move to trigger a switch as on the tray table 440 moves to change a position. In another example, the position detector component 424 may be based on an electrical contact where the tray table 440 in one position causes an electrical contact and the tray table 440 in another position causes no electrical contact.

In some aspects, the tray assembly may further include a lighting device configured to illuminate a surrounding area of the tray assembly when activated. For example, as shown in FIG. 4F, the tray assembly 410*a* may optionally include lighting devices 426A and 426B configured to illuminate a surrounding area of the tray assembly 410*a* when activated.

Figure 4G:
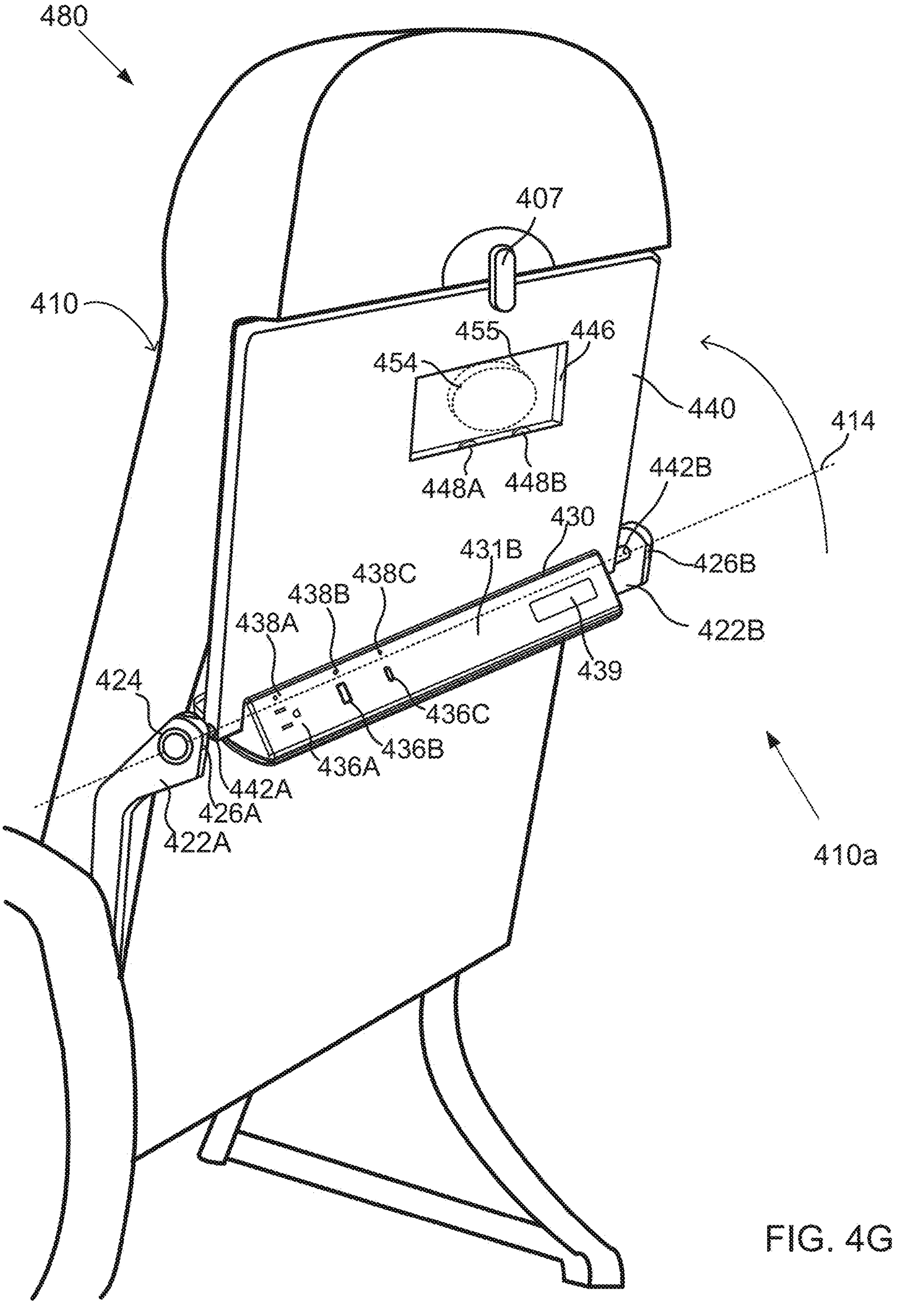
FIG. 4G is an example diagram illustrating the tray assembly of FIG. 4A installed with a passenger seat, where the tray table is in a stow position, according to some aspects of the disclosure.

FIG. 4G is an example diagram illustrating the tray assembly of FIG. 4A installed with a passenger seat, where the tray table is in a stow position, according to some aspects of the disclosure. As shown in FIG. 4G, the tray table 440 is in the stow position where the tray table 440 is substantially parallel and anchored to a seatback of the passenger seat 405 (e.g., via the locking mechanism 407). As discussed above, the tray table 440 is pivotably coupled to the first support arm 422A and the second support arm 422B to pivotably move (e.g., by rotating with respect to the rotation axis 414) between the stow position shown in FIG. 4G and the open position in FIG. 4F. Further, as discussed above, the power supply bar 430 is rotatable along with the tray table 440 when the tray table is rotated with respect to the rotation axis 414.

In some aspects, the position detector component may be configured to turn off electricity to the at least one first-surface electrical outlet and turn on electricity to the at least one second-surface electrical outlet, in response to sensing that the tray table is in the stow position (e.g., as shown in FIG. 4G), and may be configured to turn on electricity to the at least one first-surface electrical outlet and turn off electricity to the at least one second-surface electrical outlet, in response to sensing that the tray table is in the open position (e.g., as shown in FIG. 4F). In one example, electricity is provided to the first-surface electrical outlets 432A, 432B, and 432C and is cut off from the second-surface electrical outlets 436A, 436B, and 436C when the tray table 440 being in the open position (e.g., as shown in FIG. 4F) causes the position detector component 424 to activate a switch to provide the power the first-surface electrical outlets 432A, 432B, and 432C and to deactivate a switch to cut off the power to second-surface electrical outlets 436A, 436B, and 436C. On the other hand, electricity is cut off from the first-surface electrical outlets 432A, 432B, and 432C and is supplied to the second-surface electrical outlets 436A, 436B, and 436C when the tray table 440 being in the stow position (e.g., as shown in FIG. 4G) causes the position detector component 424 to deactivate a switch to cut off the power the first-surface electrical outlets 432A, 432B, and 432C and to activate a switch to provide the power to second-surface electrical outlets 436A, 436B, and 436C.

In this aspect, by cutting off the power to the first-surface electrical outlets 432A, 432B, and 432C when the tray table 440 is in the stow position, additional safety measures regarding the first-surface electrical outlets 432A, 432B, and 432C may be implemented when a passenger places the tray table 440 in the stow position and is less likely to utilize the first-surface electrical outlets 432A, 432B, and 432C than when the tray table 440 is in the open position. Similarly, by cutting off the power to the second-surface electrical outlets 436A, 436B, and 436C when the tray table 440 is in the open position, additional safety measures regarding the second-surface electrical outlets 436A, 436B, and 436C may be implemented when a passenger places the tray table 440 in the stow position and is less likely to utilize the second-surface electrical outlets 436A, 436B, and 436C than when the tray table 440 is in the stow position.

In another aspect, electricity may be provided to the first-surface electrical outlets 432A, 432B, and 432C and second-surface electrical outlets 436A, 436B, and 436C regardless of whether the tray table 440 is in the stow position (e.g., as shown in FIG. 4G) or in the open position (e.g., as shown in FIG. 4F). In this aspect, for example, the second-surface electrical outlets 436A, 436B, and 436C as well as the first-surface electrical outlets 432A, 432B, and 432C may be accessible with the tray table 440 in the open position.

In some aspects where the tray assembly includes a lighting device configured to illuminate a surrounding area of the tray assembly, the position detector component may be configured to activate the lighting device in response to sensing that the tray table is in the stow position, and may be configured to deactivate the lighting device in response to sensing that the tray table is in the open position. For example, as shown in FIG. 4F and FIG. 4G, the tray assembly 410*a* may optionally include lighting devices 426A and 426B, where the lighting devices 426A and 426B may illuminate the surrounding area of the tray assembly 410*a* (e.g., around the tray table 440) when activated. In this example, the position detector component 424 activates the lighting devices 426A and 426B when the position detector component 424 senses that the tray table 440 is in the open position, while the position detector component 424 deactivates the lighting devices 426A and 426B to turn them off when the position detector component 424 senses that the tray table 440 is in the stow position. In the example shown in FIG. 4G, the tray table 440 is in the stow position, and thus the lighting devices 426A and 426B are deactivated and turned off. On the other hand, in the example shown in FIG. 4F, the tray table 440 is in the open position, and thus the lighting devices 426A and 426B are activated and thus illuminates the surrounding area. In the example shown in FIG. 4F and FIG. 4G, the lighting devices 426A and 426B are implemented with the first support arm 422A and the second support arm 422B, respectively. However, in another example not shown in FIG. 4G, the lighting devices may be implemented in a different part of the tray assembly 410*a*, such as the power supply bar 430 and/or the tray table 440.

In an example, the first-surface indicator lights 434A, 434B, and 434C may illuminate if the position detector component 424 turns on a switch to turn on electricity to the first-surface electrical outlets 432A, 432B. and 432C, and the first-surface indicator lights 434A, 434B, and 434C may turn off if the position detector component 424 turns off the switch to turn off electricity to the first-surface electrical outlets 432A, 432B, and 432C. Similarly, for example, the second-surface indicator lights 438A, 438B, and 438C may illuminate if the position detector component 424 turns on a switch to turn on electricity to the second-surface electrical outlets 436A, 436B, and 436C, and the second-surface indicator lights 438A, 438B, and 438C may turn off if the position detector component 424 turns off the switch to turn off electricity to the second-surface electrical outlets 436A, 436B, and 436C In some aspects where the at least one first-surface electrical outlet includes at least one first AC outlet and at least one first DC outlet, and the at least one second-surface electrical outlet includes at least one second AC outlet and at least one second DC outlet, the position detector component may be configured to turn off electricity to the at least one first AC outlet and turn on electricity to the at least one second AC outlet, in response to sensing that the tray table is in the stow position, and may be configured to turn on electricity to the at least one first AC outlet and turn off electricity to the at least one second AC outlet, in response to sensing that the tray table is in the open position. In this aspect, electricity may be supplied to the at least one first DC outlet and the at least one second DC outlet regardless of whether the tray table is in the stow position or in the open position.

For example, as shown in FIG. 4E and FIG. 4G, the power supply bar 430 incudes the first electrical outlet 432A that is an AC outlet and further includes the second electrical outlet 432B and the third electrical outlet 432C that are DC outlets at the first-surface 431A, and further includes the fourth electrical outlet 436A that is an AC outlet and further includes the fifth electrical outlet 436B and the sixth electrical outlet 436C that are DC outlets at the second-surface 431B. In one example, the position detector component 424 may turn off electricity to the first electrical outlet 432A being the AC outlet while turning on electricity to the fourth electrical outlet 436A being the AC outlet when the position detector component 424 senses that the tray table 440 is in the stow position (e.g., as shown in FIG. 4G). Further, for example, the position detector component 424 may turn on electricity to the first electrical outlet 432A being the AC outlet while turning off electricity to the fourth electrical outlet 436A when the position detector component 424 senses that the tray table 440 is in the open position (e.g., as shown in FIG. 4E). In this example, electricity may be supplied to the second electrical outlet 432B, the third electrical outlet 432C, fifth electrical outlet 436B, and the sixth electrical outlet 436C that are DC outlets, regardless of whether the tray table 440 is in the stow position or the open position according to the sensing by the position detector component 424. In another different example, electricity may be supplied to all of the electrical outlets regardless of whether the tray table 440 is in the stow position or the open position according to the sensing by the position detector component 424.

Thus, systems for supplying electricity at a tray assembly for a passenger seat of a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A tray assembly for a passenger seat for a transportation vehicle, comprising:

a center bar including at least one electrical outlet; and a tray table pivotably coupled to a first support arm at a first corner of the tray table and pivotably coupled to a second support arm at a second corner of the tray table, the tray table being pivotably coupled to the first support arm and the second support arm that are coupled to the passenger seat to pivotably move between a stow position where the tray table is substantially parallel and anchored to a seatback of the passenger seat and an open position where the tray table is substantially parallel to a floor of the transportation vehicle and released away from the seatback, wherein the center bar is pivotably coupled to the tray table to be movable to a first position where the at least one electrical outlet faces substantially upward with respect to the floor, when the tray table is in the open position, and to be movable to a second position where the at least one electrical outlet faces substantially downward with respect to the floor, when the tray table is in the stow position, wherein the at least one electrical outlet is accessible with the tray table in the stow position and is accessible with the tray table in the open position.

2. The tray assembly of claim 1, wherein the tray assembly further comprises a position detector component configured to detect whether the tray table is in the stow position or in the open position, and wherein the position detector component is configured to turn off electricity to the at least one electrical outlet in response to sensing that the tray table is in the stow position, and turn on electricity to the at least one electrical outlet in response to sensing that the tray table is in the open position.

3. The tray assembly of claim 1, further comprising:

a lighting device configured to illuminate a surrounding area of the tray assembly when activated, wherein the tray assembly further comprises a position detector component configured to detect whether the tray table is in the stow position or in the open position, and wherein the position detector component is configured to activate the lighting device in response to sensing that the tray table is in the stow position, and deactivate the lighting device in response to sensing that the tray table is in the open position.

4. The tray assembly of claim 1, wherein the at least one electrical outlet includes at least one alternating current (AC) outlet and at least one direct current (DC) outlet, wherein the tray assembly further comprises a position detector component configured to detect whether the tray table is in the stow position or in the open position, and wherein the position detector component is configured to turn off electricity to the at least one AC outlet in response to sensing that the tray table is in the stow position, and turn on electricity to the at least one AC outlet in response to sensing that the tray table is in the open position, and wherein electricity is supplied to the at least one DC outlet regardless of whether the tray table is in the stow position or in the open position.

5. The tray assembly of claim 1, wherein the center bar is rotatable to make the at least one electrical outlet accessible regardless of whether the tray table is in the stow position or in the open position.

6. The tray assembly of claim 1, wherein the tray table includes at least one wireless charging module embedded within the tray table, the at least one wireless charging module configured to charge an electronic device wirelessly when the electronic device is within a threshold distance from the at least one wireless charging module.

7. The tray assembly of claim 6, wherein the at least one wireless charging module includes a first wireless charging module configured to wirelessly charge the electronic device when the electronic device is within the threshold distance from the first wireless charging module by contacting a first charging area on a top surface of the tray table, the top surface being a surface on a top side of the tray table with respect to the floor when the tray table is in the open position, and wherein a location of the first charging area corresponds to a location of the first wireless charging module embedded within the tray table.

8. The tray assembly of claim 6, wherein the at least one wireless charging module includes a second wireless charging module configured to wirelessly charge the electronic device when the electronic device is within the threshold distance from the second wireless charging module by contacting a second charging area on a bottom surface of the tray table, the bottom surface being a surface on a bottom side of the tray table facing the floor when the tray table is in the open position, wherein a location of the second charging area corresponds to a location of the second wireless charging module, and wherein the tray assembly further comprises a device holding structure configured to hold the electronic device close to the second charging area to wirelessly charge the electronic device.

9. The tray assembly of claim 6, further comprising:

the first support arm coupled to a first side of the passenger seat; and the second support arm spaced apart from the first support arm and coupled to a second side of the passenger seat, wherein at least one of the first support arm or the second support arm includes at least one power line carrying electricity to supply electricity to at least one of the at least one electrical outlet or the at least one wireless charging module.

10. A tray assembly for a passenger seat for a transportation vehicle, comprising:

a power supply bar including at least one first-surface electrical outlet at a first surface of the power supply bar and at least one second-surface electrical outlet at a second surface of the power supply bar different from the first surface; and a tray table pivotably coupled to a first support arm at a first corner of the tray table and pivotably coupled to a second support arm at a second corner of the tray table, the tray table being pivotably coupled to the first support arm and the second support arm that are coupled to the passenger seat to pivotably move between a stow position where the tray table is substantially parallel and anchored to a seatback of the passenger seat and an open position where the tray table is substantially parallel to a floor of the transportation vehicle and released away from the seatback, wherein the power supply bar is attached to the tray table to move with the tray table and is positioned to have the at least one first-surface electrical outlet face substantially upward with respect to the floor and away from the passenger seat when the tray table is in the open position, and wherein the power supply bar is positioned to have the at least one second-surface electrical outlet face substantially upward with respect to the floor and away from the passenger seat when the tray table is in the stow position.

11. The tray assembly of claim 10, wherein the tray assembly further comprises a position detector component configured to detect whether the tray table is in the stow position or in the open position.

12. The tray assembly of claim 11, wherein the position detector component is configured to turn off electricity to the at least one first-surface electrical outlet and turn on electricity to the at least one second-surface electrical outlet, in response to sensing that the tray table is in the stow position, and turn on electricity to the at least one first-surface electrical outlet and turn off electricity to the at least one second-surface electrical outlet, in response to sensing that the tray table is in the open position.

13. The tray assembly of claim 11, wherein the at least one first-surface electrical outlet includes at least one first alternating current (AC) outlet and at least one first direct current (DC) outlet, and the at least one second-surface electrical outlet includes at least one second AC outlet and at least one second DC outlet and wherein the position detector component is configured to turn off electricity to the at least one first AC outlet and turn on electricity to the at least one second AC outlet, in response to sensing that the tray table is in the stow position, and turn on electricity to the at least one first AC outlet and turn off electricity to the at least one second AC outlet, in response to sensing that the tray table is in the open position, and wherein electricity is supplied to the at least one first DC outlet and the at least one second DC outlet regardless of whether the tray table is in the stow position or in the open position.

14. The tray assembly of claim 10, wherein the at least one second-surface electrical outlet is accessible with the tray table in the stow position, and wherein the at least one first-surface electrical outlet is accessible with the tray table in the open position.

15. The tray assembly of claim 10, wherein the tray table includes at least one wireless charging module embedded within the tray table, the at least one wireless charging module configured to charge an electronic device wirelessly when the electronic device is within a threshold distance from the at least one wireless charging module.

16. The tray assembly of claim 15, wherein the at least one wireless charging module includes a first wireless charging module configured to wirelessly charge the electronic device when the electronic device is within the threshold distance from the first wireless charging module by contacting a first charging area on a top surface of the tray table, the top surface being a surface on a top side of the tray table with respect to the floor when the tray table is in the open position, and wherein a location of the first charging area corresponds to a location of the first wireless charging module embedded within the tray table.

17. The tray assembly of claim 15, wherein the at least one wireless charging module includes a second wireless charging module configured to wirelessly charge the electronic device when the electronic device is within the threshold distance from the second wireless charging module by contacting a second charging area on a bottom surface of the tray table, the bottom surface being a surface on a bottom side of the tray table facing the floor when the tray table is in the open position, wherein a location of the second charging area corresponds to a location of the second wireless charging module, and wherein the tray assembly further comprises a device holding structure configured to hold the electronic device close to the second charging area to wirelessly charge the electronic device.

18. The tray assembly of claim 15, further comprising:

the first support arm coupled to a first side of the passenger seat; and the second support arm spaced apart from the first support arm and coupled to a second side of the passenger seat, wherein at least one of the first support arm or the second support arm includes at least one power line carrying electricity to supply electricity to at least one of the at least one first-surface electrical outlet or the at least one second-surface electrical outlet or the at least one wireless charging module.

* * * * *